US011216625B2

(12) United States Patent
Pettus

(10) Patent No.: US 11,216,625 B2
(45) Date of Patent: Jan. 4, 2022

(54) HIGH BIT DENSITY MILLIMETER WAVE RFID SYSTEMS, DEVICES, AND METHODS OF USE THEREOF

(71) Applicant: Vubiq Networks, Inc., Irvine, CA (US)

(72) Inventor: Michael Gregory Pettus, San Juan Capistrano, CA (US)

(73) Assignee: VUBIQ NETWORKS, INC., Irvine, CA (US)

( * ) Notice: Subject to any disclaimer, the term of this patent is extended or adjusted under 35 U.S.C. 154(b) by 0 days.

(21) Appl. No.: 16/704,509

(22) Filed: Dec. 5, 2019

(65) Prior Publication Data

US 2020/0184161 A1 Jun. 11, 2020

Related U.S. Application Data

(60) Provisional application No. 62/775,479, filed on Dec. 5, 2018.

(51) Int. Cl.
| | | |
|---|---|---|
| G06K 7/10 | (2006.01) | |
| G01S 13/89 | (2006.01) | |
| G01S 13/75 | (2006.01) | |
| G06K 19/07 | (2006.01) | |

(52) U.S. Cl.
CPC ........ *G06K 7/10297* (2013.01); *G01S 13/751* (2013.01); *G01S 13/89* (2013.01); *G06K 19/0723* (2013.01)

(58) Field of Classification Search
CPC ............ G06K 7/10297; G06K 19/0723; G01S 13/751; G01S 13/89
USPC ....................................................... 235/451
See application file for complete search history.

(56) References Cited

U.S. PATENT DOCUMENTS

| 4,684,952 A | 8/1987 | Munson et al. |
|---|---|---|
| 4,752,680 A | 6/1988 | Larsson |
| 5,103,210 A | 4/1992 | Rode et al. |
| 5,218,189 A | 6/1993 | Hutchison |
| (Continued) | | |

FOREIGN PATENT DOCUMENTS

| EP | 1062623 A1 | 6/2000 |
|---|---|---|
| WO | 2004/081545 A1 | 9/2004 |

OTHER PUBLICATIONS

International Search Report and Written Opinion to corresponding PCT Application Serial No. PCT/US19/64687, dated Feb. 25, 2020.

(Continued)

*Primary Examiner* — Michael G Lee
*Assistant Examiner* — David Tardif
(74) *Attorney, Agent, or Firm* — Troutman Pepper Hamilton Sanders LLP (Rochester)

(57) ABSTRACT

A method includes transmitting, by a radiofrequency identification (RFID) reader device, a first electromagnetic radiation at a first polarization to a scan area and second electromagnetic radiation at a second polarization to the scan area. Re-radiated first electromagnetic radiation is received from an RFID tag located in the scan area at the first polarization. Re-radiated second electromagnetic radiation is received from the RFID tag at the second polarization. A radar image is generated based on the first and second re-radiated electromagnetic radiation. One or more items of information encoded in one or more microstructure elements located on the RFID tag are decoded based on the generated radar image. An RFID reader device and an RFID system are also disclosed.

18 Claims, 16 Drawing Sheets

(56) References Cited

U.S. PATENT DOCUMENTS

| | | | |
|---|---|---|---|
| 5,381,137 A | 1/1995 | Ghaem et al. | |
| 5,444,223 A | 8/1995 | Blama | |
| 5,486,830 A | 1/1996 | Axline, Jr. et al. | |
| 5,726,630 A | 3/1998 | Marsh et al. | |
| 5,767,802 A | 6/1998 | Kosowsky et al. | |
| 5,784,543 A | 7/1998 | Marchand | |
| 5,995,019 A | 11/1999 | Chieu | |
| 6,027,027 A | 2/2000 | Smithgall | |
| 6,104,333 A | 8/2000 | Wood, Jr. | |
| 6,236,761 B1 | 5/2001 | Marchand | |
| 6,405,132 B1 | 6/2002 | Breed et al. | |
| 6,424,315 B1 | 7/2002 | Glen et al. | |
| 6,427,922 B1 | 8/2002 | Marchand | |
| 6,476,756 B2 | 11/2002 | Landt | |
| 6,509,836 B1 | 1/2003 | Inoram | |
| 6,526,352 B1 | 2/2003 | Breed et al. | |
| 6,542,083 B1 | 4/2003 | Richley et al. | |
| 6,545,646 B2 | 4/2003 | Marchand | |
| 6,547,140 B2 | 4/2003 | Marchand | |
| 6,600,428 B1 | 7/2003 | O'Toole et al. | |
| 6,696,879 B1 | 2/2004 | O'Toole et al. | |
| 6,708,881 B2 | 3/2004 | Hartmann | |
| 6,720,920 B2 | 4/2004 | Breed et al. | |
| 6,721,289 B1 | 4/2004 | O'Toole et al. | |
| 6,735,183 B2 | 5/2004 | O'Toole et al. | |
| 6,748,797 B2 | 6/2004 | Breed et al. | |
| 6,768,944 B2 | 7/2004 | Breed et al. | |
| 6,771,981 B1 | 8/2004 | Zalewski et al. | |
| 6,820,897 B2 | 11/2004 | Breed et al. | |
| 6,836,472 B2 | 12/2004 | O'Toole et al. | |
| 6,842,106 B2 | 1/2005 | Hughes et al. | |
| 6,867,983 B2 | 3/2005 | Liu et al. | |
| 6,874,639 B2 | 4/2005 | Lawandy | |
| 6,891,391 B2 | 5/2005 | Hiroki | |
| 6,897,284 B2 | 5/2005 | Liu et al. | |
| 6,970,089 B2 | 11/2005 | Carrender | |
| 6,972,714 B1 | 12/2005 | Baharav et al. | |
| 7,617,342 B2 * | 11/2009 | Rofougaran | H01Q 1/2275 235/492 |
| 9,680,512 B2 * | 6/2017 | Chen | H04J 11/00 |
| 2002/0140557 A1 | 10/2002 | Dukler et al. | |
| 2003/0002029 A1 | 1/2003 | Dukler et al. | |
| 2003/0035131 A1 | 2/2003 | Dukler et al. | |
| 2003/0137446 A1 | 7/2003 | Vavik | |
| 2004/0159708 A1 | 8/2004 | Yogev et al. | |
| 2004/0169847 A1 | 9/2004 | Dukler | |
| 2004/0211840 A1 | 10/2004 | Yogev et al. | |
| 2004/0217171 A1 | 11/2004 | de Vos et al. | |
| 2005/0280504 A1 * | 12/2005 | Pettus | G08B 13/2462 340/10.1 |
| 2006/0109176 A1 | 5/2006 | Lee et al. | |
| 2009/0014520 A1 * | 1/2009 | Kofman | G06K 7/143 235/439 |
| 2009/0295567 A1 * | 12/2009 | Bellows | H01Q 21/24 340/539.11 |
| 2010/0052857 A1 | 3/2010 | Ozeki et al. | |
| 2017/0116444 A1 | 4/2017 | Karmaker et al. | |

OTHER PUBLICATIONS

Zhou, Lei et al., "Reflectivity of Planar Metallic Fractal Patterns," Applied Physics Letters, vol. 82, No. 7, Feb. 17, 2003, pp. 1012-1014.

Armin W. Doerry and Fred M. Dickey; Synthetic Aperture Radar; Optics & Photonic News, Nov. 2004; DQS. 28-33.

A. Meta and P. Hoogeboom, International Research Centre for Telecommunications-transmission and Radar, Delft University of Technology; Time analysis and processing of FM-CW SAR signals; pp. 1-6.

Envisat's Mission and System Instruments Product Handbook, Section 5.2 RADAR and SAR Glossary; as of Jun. 15, 2005; pp. 1-21.

J. Huang, Spacecraft Telecommunications Equipment Section; Analysis of a Microstrip Rejlectarray Antennafor Microspacecraft Avolications, TDA Progress Report 42-120; Feb. 15, 1995; pp. 153-173.

Malibu Research, Calabasas, CA; FLAPS™ Reflector Antennas, pp. 1-6.

Dr. Victor C. Chen, Mark E. Dunham, Ping Chen, Ph.D. and Prof. C.H. Chen; Four Practical Application of Joint Time-Frequency Analysis, Applying the Joint Time-Frequency Transform to Inverse Synthetic Aperture Radar; Joint Time-Frequency Representations for Real-Time Detection of Time-Varying Signals; Economic Data Analysis with the Gabor Spectrogram, The Gabor Spectrogram in Ultrasonic Nondestructive Materials Evaluation, National Instruments Corporation, Application Note 067; May 1995; pp. 2-15.

Dale Dubbert, George Sloan and Armin Doerry; FPGA's Role in the Development of Synthetic SARs, www.wirelessdesignmag.com; 02:s. 1-4.

Gildas P. Gauthier, Jean-Pierre Raskin, Linda P.B. Katehi and Gabriel M. Rebeiz; A 94-GHz Aperture-Coupled Micromachined Microstrip Antenna, IEEE Transactions on Antennas and Propagation, vol. 47, No. 12; Dec. 1999; pp. 1761-1766.

A. Meta and P. Hoogeboom, International Research Centre for Telecommunications-transmission Radar, Delft University of Technology; High Resolution Airborne FM-CW SAR: Digital Signal Processing Aspects; pp. 1-3.

Dr. Allen E. Fuhs, Ph.D.; Radar Cross Section (RCS); pp. 4-11.1-4-11.5.

Chris Burroughs; Sandia's miniSAR offers great promise for reconnaissance and precision-guided weapons; Sandia LabNews, vol. 56, No. 3; Feb. 6, 2004; pp. 1 and 4.

Dr. D. Gabor, A New Microscopic Principle; Nature, vol. 161; May 15, 1948; pp. 777-778.

J.S. Dunn et al.; Foundation of rf CMOS and SiGe BiCMOS technologies; IBM J. Res. & Dev.; vol. 47, No. 2/3; Mar./May 2003; pp. 101-138.

Notification of Transmittal, International Search Report, Written Opinion ofInternational Searching Authority; PCT/US2005/022146; Int'l Filing Date Jun. 22, 2005; 10 pages.

\* cited by examiner

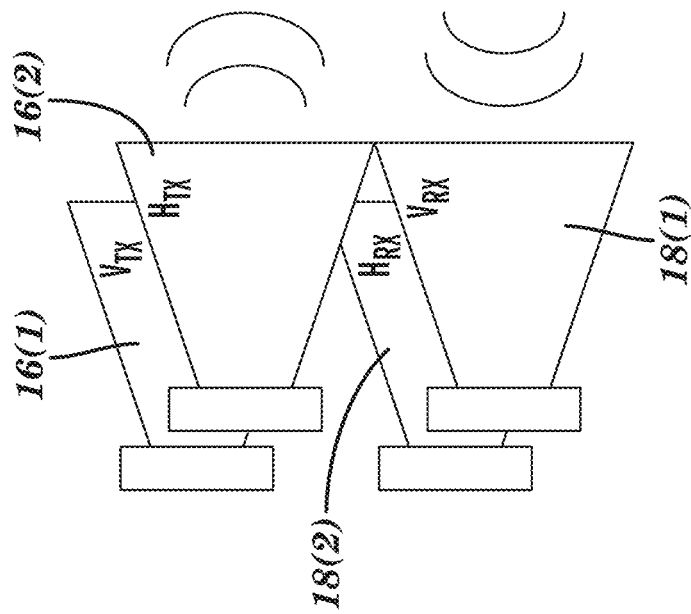
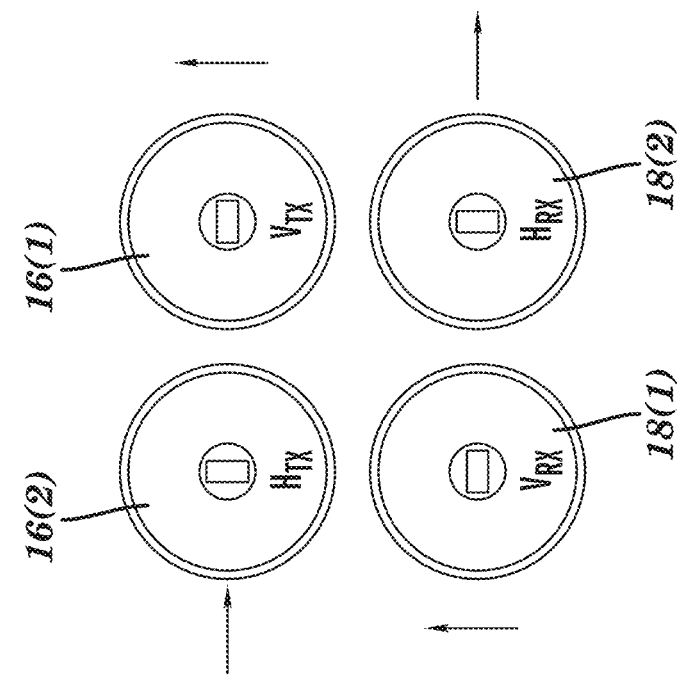

| Material | Conductivity $\sigma$ S/m | Resistivity $\rho$ $\Omega$m | RCS $\sigma^m$ dBsm |
|---|---|---|---|
| Copper | 5.80E+07 | 1.72E-08 | -23.02 |
| Gold | 4.09E+07 | 2.44E-08 | -23.02 |
| Ink1 2.2e7 | 2.20E+07 | 4.55E-08 | -23.02 |
| Ink2 1.0e6 | 1.00E+06 | 1.00E-06 | -23.04 |
| Ink3 1.0e2 | 1.00E+02 | 1.00E-02 | -25.96 |
| Ink4 1.0e1 | 1.00E+01 | 1.00E-01 | -31.20 |
| Ink5 5.0e0 | 5.00E+00 | 2.00E-01 | -34.24 |

*FIG. 11 (cont.)*

| SAMPLE (#) | VERT I (V) | VERT Q (V) | HORIZ I (V) | HORIZ Q (V) |
|---|---|---|---|---|
| 205398 | 0.166508 | 0.233518 | 0.07891 | -0.12899 |
| 205399 | 0.224322 | 0.025361 | 0.001715 | 0.321131 |
| 205400 | 0.132991 | -0.01761 | -0.33589 | 0.006494 |
| 205401 | 0.148929 | 0.011999 | -0.14986 | -0.52261 |
| 205402 | 0.224947 | -0.10771 | 0.203375 | -0.17376 |

HIGH BIT DENSITY MILLIMETER WAVE RFID SYSTEMS, DEVICES, AND METHODS OF USE THEREOF

This application claims the benefit of U.S. Provisional Patent Application Ser. No. 62/775,479, filed Dec. 5, 2018, which is hereby incorporated by reference in its entirety.

FIELD

This technology generally relates to radio frequency identification (RFID) systems and, in particular, to high bit density chipless millimeter wave RFID systems, devices, and methods thereof.

BACKGROUND

RFID technology makes use of item tags that fall into one of three major categories: (1) active systems that include a local power source as part of the RFID tag and include circuitry or an integrated circuit (IC), or silicon chip, for communicating and storing identification or other data that is typically read using an RFID reader; (2) passive systems where the power required for the tag IC and communications with that IC is supplied by the RFID reader; and (3) chipless systems that use tags without ICs, or chips, where the tags are read wirelessly by a device that reads and decodes information represented by various chipless technology methods.

One of the major requirements in any RFID system is to store as much information as possible on the RFID tag. As chipless RFID systems do not use a semiconductor or "chip" storage device on the tag, the data stored on the tag must be encoded and stored through some other mechanism. An important objective of chipless RFID system design is to keep the manufacturing costs of the tags, which store the encoded information, as low as possible. One approach to reduce the cost of chipless tags is to use printing methods that typically lay down an electrically conductive or metallic pattern on the tag substrate material. The printed patterns are used to encode information as stored data. The RFID reader wirelessly interacts with the tag and decodes the data as a "read." Different methods may be utilized to represent or encode data in the printed patterns on the tag. The amount of data that is represented in a given area is defined as the bit density of the chipless tag.

Various methods have been used to represent information in printed patterns. In one example, information is represented or encoded on a tag using a tuned circuit implemented through lumped-element switched resonant circuits. The tags are read through a spectrum signature approach, measuring magnitude response as a function of frequency. Broadband interrogating pulses are used to cover the range of tuned frequencies of the resonant circuits. The constraint on the number of bits represented per unit area is controlled by the physical size of the tuned circuit, and the tuning sharpness, or Q, of the circuit. The higher the Q of the tuned circuit, the more frequency discrimination or spectral signature discrimination is possible, which increases the ability to represent or encode more bits within a given tag area. However, Q is determined by the electrical conductivity of the resonant circuit elements. Thus, the system requires using high conductivity materials to increase bit density, which increases costs of manufacturing the tags. Further, the bit density using lumped element tuned circuits to generate distinct spectral signatures is only on the order of several bits per square inch area.

Other methods have used synthetic aperture radar (SAR) imaging to read data encoded in chipless tags, which increases the potential bit density by enabling the spatial imaging domain as another variable. These methods have utilized up to 60 GHz SAR imaging techniques.

One method has used meander line tag elements to encode the tags for SAR imaging, with an estimated upper bit density of 12 bits per square inch. Another approach uses a plurality of antenna elements instead of lumped element resonant circuits or meandered strip lines. At the limit of 60 GHz frequency described, the practical size of the antenna elements is on the order of 1.5 mm×1.5 mm. More importantly, the parametric variables of element phase measurement and element polarization measurement in the example implementation shows 4 states for each, yielding a 4×4 or a 16-state code ($Log_2(16)=4$ bits/element). Given the small size of the antenna elements at a 60 GHz operating frequency, approximately twenty-five elements fit into a square inch of tag area with appropriate element to element isolation, which yields an estimated upper bit density at 100 bits per square inch.

In each of the methods described, the tag bit density is less than passive or active RFID systems where up to thousands of bits are stored within a memory chip or ASIC located on the tag itself, or separately connected to an external circuit or sensor.

SUMMARY

A method includes transmitting, by a radiofrequency identification (RFID) reader device, a first electromagnetic radiation at a first polarization to a scan area and second electromagnetic radiation at a second polarization to the scan area. Re-radiated first electromagnetic radiation is received from an RFID tag located in the scan area at the first polarization. Re-radiated second electromagnetic radiation is received from the RFID tag at the second polarization. A radar image is generated based on the first and second re-radiated electromagnetic radiation. One or more items of information encoded in one or more microstructure elements located on the RFID tag are decoded based on the generated radar image. An RFID reader device and an RFID system are also disclosed.

A radiofrequency identification (RFID) reader device includes at least a radiofrequency transmitter configured to transmit first electromagnetic radiation at a first polarization to a scan area and configured to transmit second electromagnetic radiation at a second polarization to the scan area. A first radiofrequency receiver is configured to receive re-radiated first electromagnetic radiation from an RFID tag located in the scan area at the first polarization, and a second radiofrequency receiver is configured to receive re-radiated second electromagnetic radiation from the RFID tag at the second polarization. The RFID reader device further includes at least one of configurable hardware logic configured to be capable of implementing and a processor coupled to a memory and configured to execute programmed instructions stored in the memory including generating a radar image based on the re-radiated first and second electromagnetic radiation from the first and second radiofrequency receivers. One or more items of information encoded in one or more microstructure elements located on the RFID tag are decoded based on the generated radar image.

A RFID system includes at least one RFID tag having one or more microstructure elements located thereon and an RFID reader device. The RFID reader device includes at least a radiofrequency transmitter configured to transmit first electromagnetic radiation at a first polarization to a scan area and configured to transmit second electromagnetic radiation at a second polarization to the scan area. A first radiofrequency receiver is configured to receive re-radiated first electromagnetic radiation from an RFID tag located in the scan area at the first polarization, and a second radiofrequency receiver is configured to receive re-radiated second electromagnetic radiation from the RFID tag at the second polarization. The RFID reader device further includes at least one of configurable hardware logic configured to be capable of implementing and a processor coupled to a memory and configured to execute programmed instructions stored in the memory including generating a radar image based on the re-radiated first and second electromagnetic radiation from the first and second radiofrequency receivers. One or more items of information encoded in at least one of the one or more microstructure elements located on the RFID tag are decoded based on the generated radar image A chipless RFID includes one or more microstructure elements located thereon. Each of the one or more microstructures has a polarization state and a phase state. Each of the one or more microstructure elements are located at least one wavelength apart from each of the other microstructure elements of the RFID tag The present technology advantageously provides a system including chipless RFID readers and tags that optimizes the ability to achieve high tag bit densities, while reducing chipless tag cost. The system provides an increase in the RFID system operating frequency, which reduces the physical tag element size. The system advantageously utilizes small physical size printable tag element antennas based on the ½ λ microstrip patch, which allows for small physical spacing between tag elements antennas that is optimized for low inter-element coupling.

The system further employs advanced synthetic aperture radar (SAR) and inverse synthetic aperture radar (ISAR) reader technology using fully polarimetric radar, which enables high-resolution polarization discrimination and high-resolution phase discrimination. The tag antenna elements utilized can be optimized to control polarization by altering the E-field rotational geometric orientation. The phase response can also be altered by changing the length and/or geometry of the antenna element phase structures that set the time delay of the re-radiated energy. The combination of the imaging techniques and the increase the number of decodable polarization states and phase states for a single tag antenna element increases the bit density that can be achieved for the chipless tags utilized. The system can advantageously be used with low-cost printable electrically conductive materials that maintain high re-radiation efficiency and high radar cross section (RCS) values. Finally, the use of frequency modulated continuous wave (FMCW) SAR with a wide sweep bandwidth advantageously provides high image resolution.

The system can be advantageously employed and provide the aforementioned advantages in any usage requiring RFID tag or sensor operation, including, but not limited to: inventory identification; asset management tracking and shipping container location; vehicular access control (e.g. toll ways); moving vehicle identification; healthcare identification and tracking of patients, drugs, equipment and personnel identification, tracking and monitoring of personnel and equipment for security purposes; identification of luggage and packages at airports; systems for locating lost objects (e.g. keys, files, golf balls, clothing articles), although any other uses can be contemplated.

BRIEF DESCRIPTION OF THE DRAWINGS

FIGS. 3A and 3B are a front view and a side view of the antenna of the exemplary millimeter wave RFID reader device of the present technology.

DETAILED DESCRIPTION

An example of an RFID system 10 is illustrated in FIGS. 1-9. In this example, the RFID system is a high-bit chip density millimeter wave system. In this particular example, the RFID system 10 includes an RFID reader device 12 and an RFID tag 14, although the RFID system 10 may include other types and/or numbers of other systems, device, components, and/or other elements in other combinations, including additional reader devices and any number of RFID tags, by way of example only. The present technology advantageously provides a millimeter wave RFID system utilizing chipless (i.e., non-powered) RFID tags, that allows for increased bit density of information that may be encoded on the chipless RFID tags. The present technology further minimizes the costs associated with manufacturing the RFID chipless tags.

Figure 1:
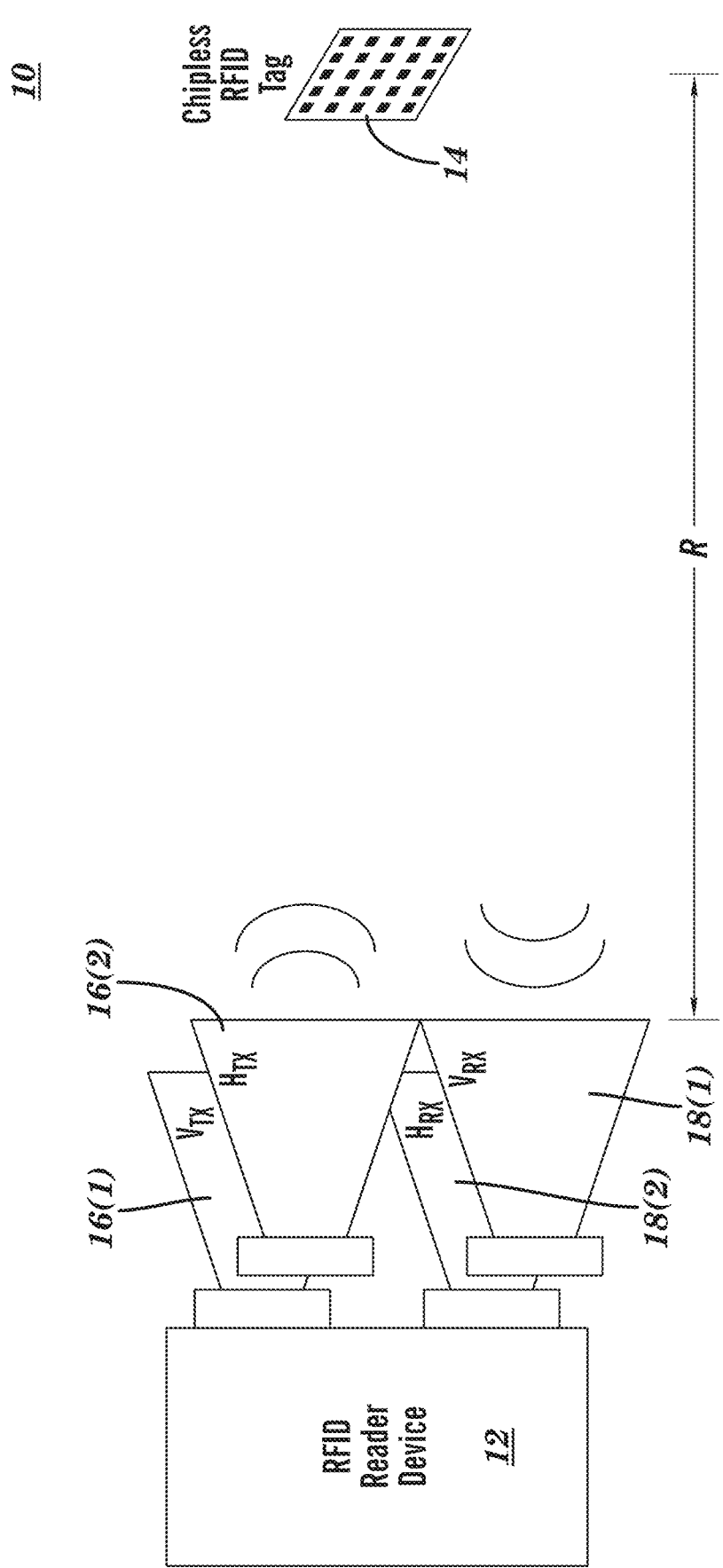
FIG. 1 is a block diagram of an exemplary RFID system of the present technology including an exemplary millimeter wave RFID reader device interrogating an exemplary chipless RFID tag.
Figure 2A:
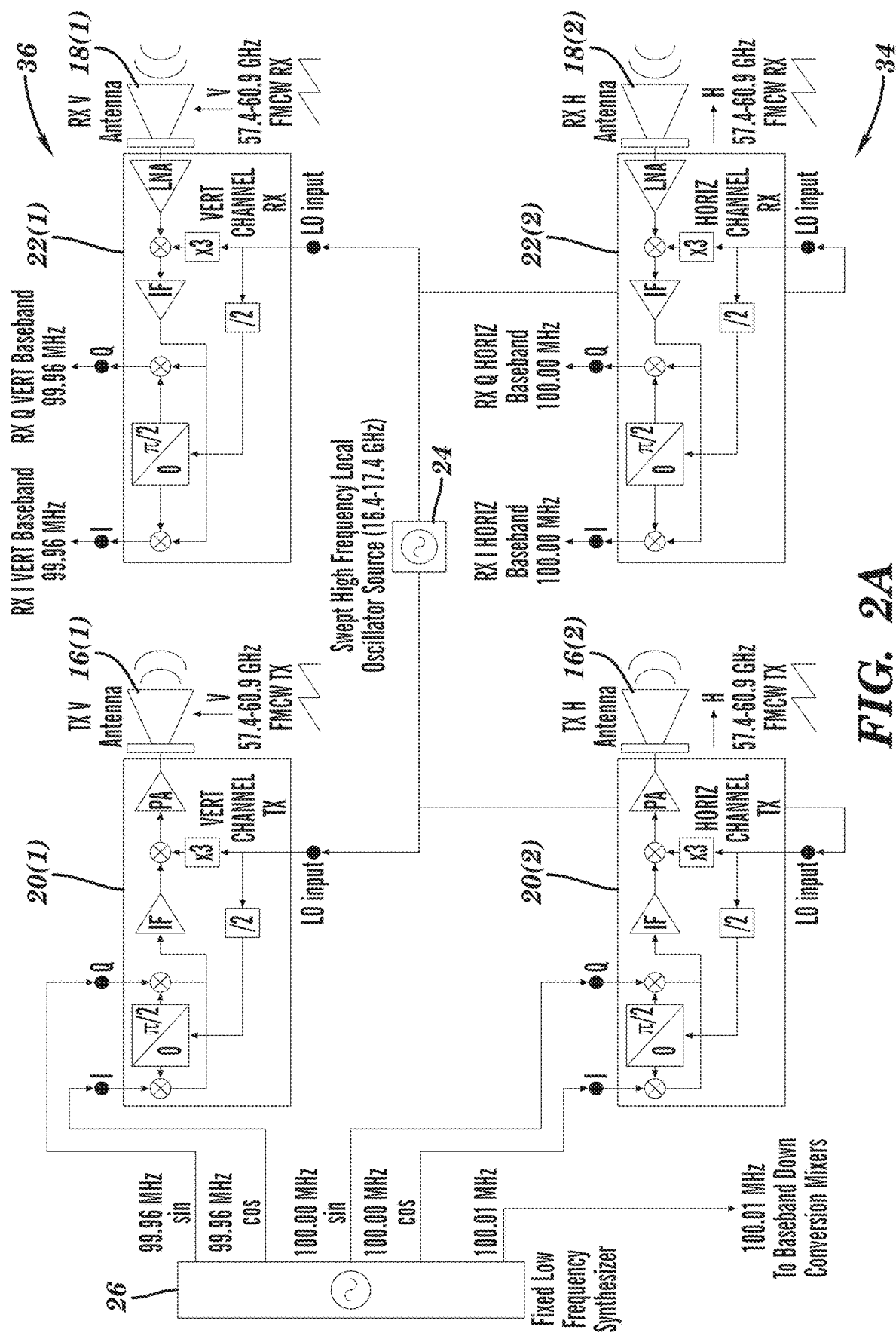
FIG. 2A is a circuit diagram of transmitters, receivers, and frequency control for an exemplary millimeter wave RFID reader device of the present technology.
Figure 2B:
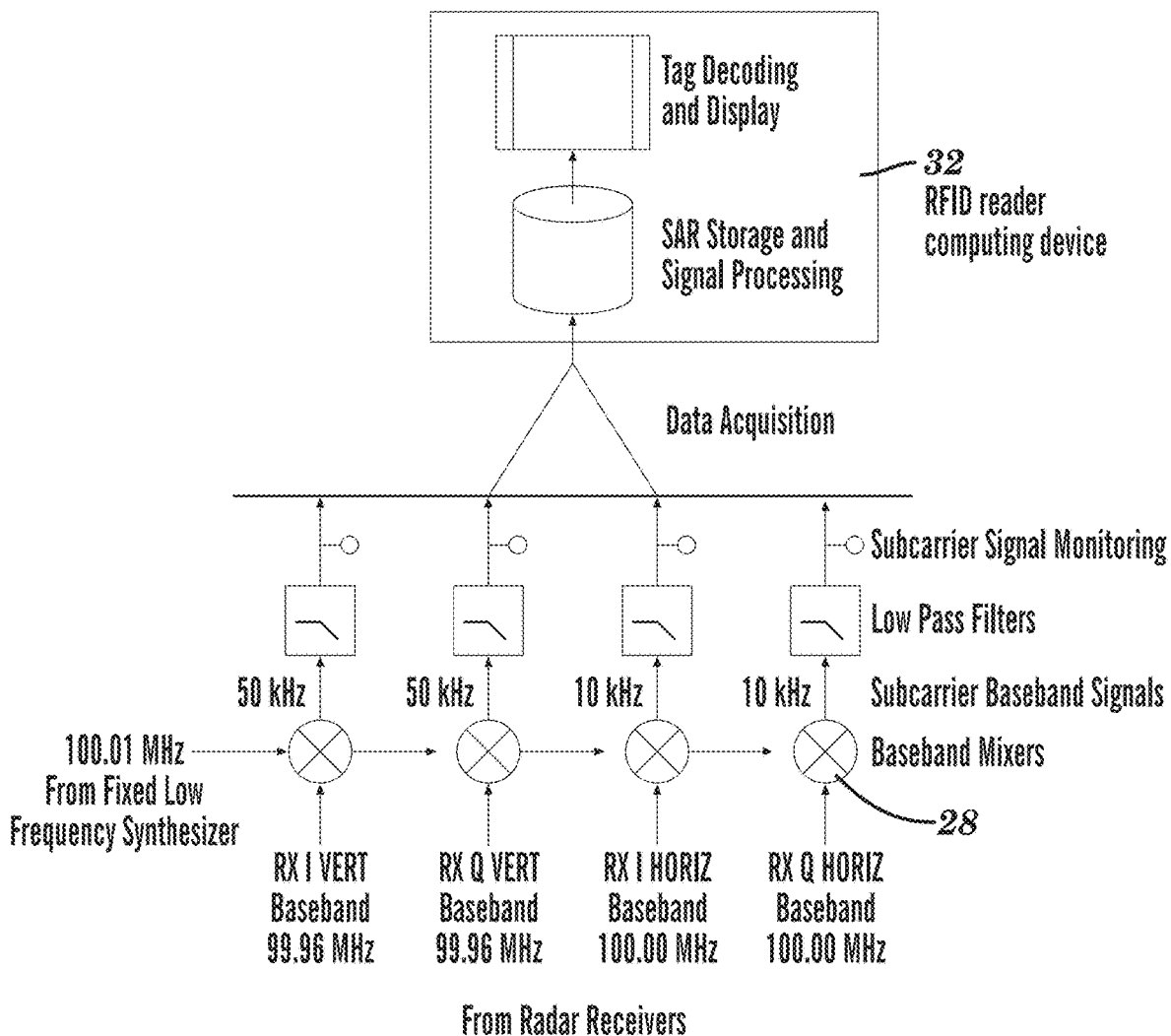
FIG. 2B is a schematic view of the subcarrier down conversion, data acquisition, and signal processing of the exemplary millimeter wave RFID reader device of the present technology shown in FIG. 2A.

Referring now more specifically to FIGS. 1, 2A, and 2B, the exemplary RFID reader device 12 utilizes fully polarimetric synthetic aperture radar (SAR) with high resolution polarization and phase discrimination detection that resolves both polarization and phase states of the interrogated RFID tag 14, as described in further detail below. Although a single RFID tag 14 is shown, it is to be understood that the RFID reader device 12 may be utilized to interrogate any number of RFID tags in the scan area of the RFID reader device 12.

The specific type of SAR radar architecture is application dependent. The SAR radar can be enabled by moving the RFID reader device 12 in standard SAR. Alternatively, the SAR radar can be enabled by moving the chipless RFID tag 10 that is being interrogated in inverse SAR (ISAR). In yet another example, the radar can be enabled using a fixed RFID reader device with an antenna array.

The RFID reader device 12 of examples of the present technology is used to image and decode the chipless RFID tag 14, by way of example, and utilizes wideband, frequency modulation continuous wave (FMCW) radar, although the RFID reader device 12 may be employed to image and decode any number of chipless RFID tags in the scan area of the RFID reader device 12. FMCW radar may be advantageously utilized for short distance applications such as RFID. Traditionally, SAR radar used in aircraft and satellites uses pulse radar, where the radio frequency propagation time delay between the radar platform and the target area is long enough so that the radar has time to switch between the transmitting mode and receiving mode. Typical pulse radar distances are in excess of 1 km, which defines the round trip time for a transmitted radar pulse to be greater than 6 µs. However, for RFID systems, such as RFID system 10, where in many cases the distance, or radar range (R), is on the order of a few meters, pulse radar switching is difficult due to the very short round trip time from the radar to the target and back. For example, at R=1 meter from the RFID reader device 12 to the RFID tag 14, the round trip delay for the radar signal is less than 7 ns. If pulse type radar were used, it would require the ability to switch between the transmitting mode and receiving mode in less than 7 ns, which results in a challenging and costly radar design. FMCW radar transmits and receives at the same time, which eliminates a switching time between transmitting and receiving modes. Accordingly, examples of the present technology employ FMCW radar for the exemplary RFID reader device 12.

Based on the practical size and bit densities of the chipless RFID tag 14 utilized in examples of the present technology along with various SAR types of technologies, as described in further detail below, the RFID reader device 12 may have an operating frequency in the range of 60 GHz up through 240 GHz, by way of example only, although other operating frequencies may be utilized. In one example, the RFID reader device 12 is configured to operate at 240 GHz with an associated wavelength (λ) of 1.25 millimeters. The RFID reader device 12 may be formed using silicon germanium semiconductor process, such as disclosed in Bredendiek, C. et al., "A 240 GHz single-chip radar transceiver in a SiGe bipolar technology with on-chip antennas and ultra-wide tuning range," IEEE Radio Frequency Integrated Circuits Symposium (2013) and "High-Resolution 240-GHZ Radar with SiGe Chip", Fraunhofer Institute for High Frequency Physics and Radar Techniques FHR (2018), the disclosures of which are hereby incorporated by reference in their entirety. In another example, examples of the present technology may utilize RFID SAR operating frequencies for the RFID reader device 12 up through 1 THz with the increase in higher resolution printing technologies for the RFID tag 14.

Referring now more specifically to FIGS. 1-4B, the exemplary fully polarimetric RFID reader device 12 includes transmitter antennas 16(1) and 16(2), receiver antennas 18(1) and 18(2), transmitters 20(1) and 20(2), receivers 22(1) and 22(2), a local oscillator 24, a frequency synthesizer 26, baseband mixers 28, low pass filters 30, and a RFID reader computing device 32, although the RFID reader device 12 may include other types and/or numbers of other elements or components in other combinations such as additional electronics such as analog to digital converters.

Referring now to FIGS. 1, 2A, 3A, and 3B, the transmitter antennas 16(1) and 16(2) and the receiver antennas 18(1)-18(2) used in this example are small aperture, millimeter wave horn type antennas with a 20° radiation beam width pattern, although other antenna types and other beam width patterns may be used depending upon the specific RFID application. The transmitter antennas 16(1) and 16(2) are coupled to the transmitters 20(1) and 20(2), respectively. Although two transmitters are used in this example, a single transmitter could be employed with a power splitter connected to two separately polarized antennas. Referring again to FIGS. 1, 2A, 3A, and 3B, the receiver antenna 18(1) and 18(2) are coupled to the receivers 22(1) and 22(2), respectively. In one example, the transmitters 20(1) and 20(2) and receivers 22(1) and 22(2) may be implanted as integrated circuits located on the same silicon chip. In another example, the transmitters and receivers may be implemented as transceivers that are configured to simultaneously transmit and receive electromagnetic radiation.

More specifically, as shown in FIG. 2A the exemplary RFID reader device 12 includes a horizontal channel 34 and a vertical channel 36 to provide horizontal and vertical polarization transmitter and receiver pairs, respectively. Horizontal channel 34 includes transmitter 16(2) and receiver 18(2) for horizontal polarization, while the vertical channel 36 includes transmitter 16(1) and receiver 18(1) for vertical polarization, although other architectures may be employed.

Referring to FIGS. 3A and 3B, an example of the configuration for the transmitter antennas 16(1) and 16(2) and the receiver antennas 18(1) and 18(2) of the RFID reader device 12 of examples of the present technology is illustrated. Referring more specifically to FIG. 3A, the E-field or polarization sense (arrows) for each of the transmitter antennas 16(1) and 16(2) and the receiver antennas 18(1) and 18(2) is shown. Transmitter antenna 16(1) provides a vertical polarization transmitter ($V_{TX}$) while transmitter antenna 16(2) provides a horizontal polarization transmitter ($H_{TX}$). In this example, transmitter antennas 16(1) and 16(2) are arranged on the top row of the antenna structure. Receiver antenna 18(1) provides a vertical polarization receiver ($V_{RX}$)

while receiver antenna 18(2) provides a horizontal polarization transmit ($H_{RX}$). In this example, receiver antennas 18(1) and 18(2) are arranged on the bottom row of the antenna structure, although other configurations may be utilized. The transmitters 20(1) and 20(2) and receivers 22(1) and 22(2), and their associated transmitter antennas 16(1) and 16(2) and the receiver antennas 18(1) and 18(2), respectively, are mounted at close spacing to emulate a monostatic radar architecture. Using millimeter wave for the radar operating frequency results in small antenna aperture dimensions, on the order of a few centimeters, which allows close physical spacing.

Those of ordinary skill in the art of short-range FMCW radar will understand the system parameters for designing radars that work effectively from a few centimeters up through hundreds of meters. In examples of the present technology, the operating frequencies of the transmitters 20(1) and 20(2) and the receivers 22(1) and 22(2) are phase locked together, and are simultaneously frequency modulated with a continuous ramp signal, or swept, over a large frequency range. In one example embodiment, the RFID reader device 12 provides a 60 GHz FMCW radar that is swept from 57.4 GHz to 60.9 GHz, or a 3.5 GHz sweep bandwidth. In another example, the RFID reader device 12 uses a 60 GHz FMCW radar that is swept from 57 GHz to 71 GHz, or a 14 GHz sweep bandwidth. In yet another example, the RFID reader device 12 uses a 120 GHz FMCW radar that is swept from 110 GHz to 130 GHz, or a 20 GHz sweep bandwidth. And in a further example, the RFID reader device 12 provides a 240 GHz FMCW radar is swept from 220 GHz to 260 GHz, or a 40 GHz sweep bandwidth. As the swept bandwidth is increased, the SAR resolution and signal to noise and signal to clutter ratio is increased.

Referring again to FIG. 2A, the local oscillator 24 is coupled to the transmitters 20(1) and 20(2) and receivers 22(1) and 22(2) to provide an external local oscillator (LO) source radio frequency (RF) signal as inputs to both pairs of transmitters 20(1) and 20(2) and receivers 22(1) and 22(2) for both the horizontal channel 34 and the vertical channel 36. Those of ordinary skill in the art of radio system design will recognize the double conversion architecture.

Figure 4B:
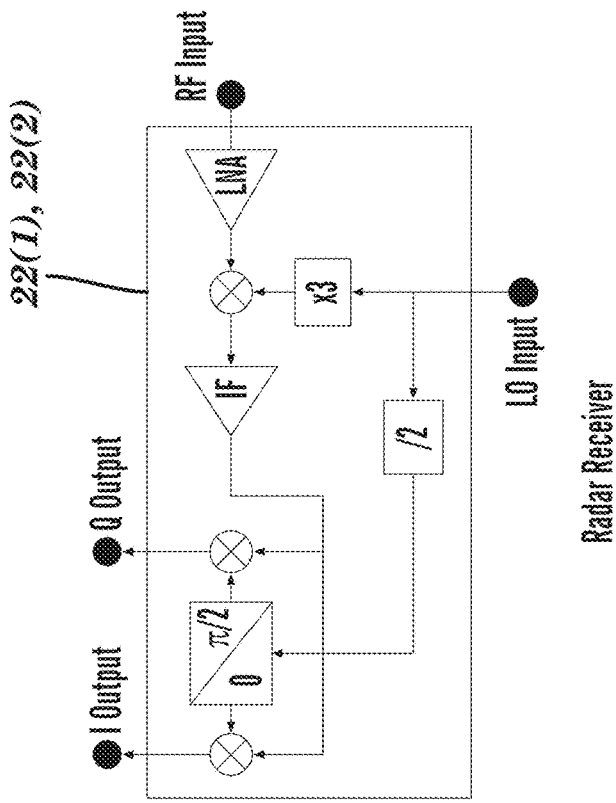
FIGS. 4A and 4B are circuit diagrams for the exemplary radar receiver (FIG. 4A) and an exemplary the radar transmitter (FIG. 4B) shown in FIG. 2A.
Figure 4A:
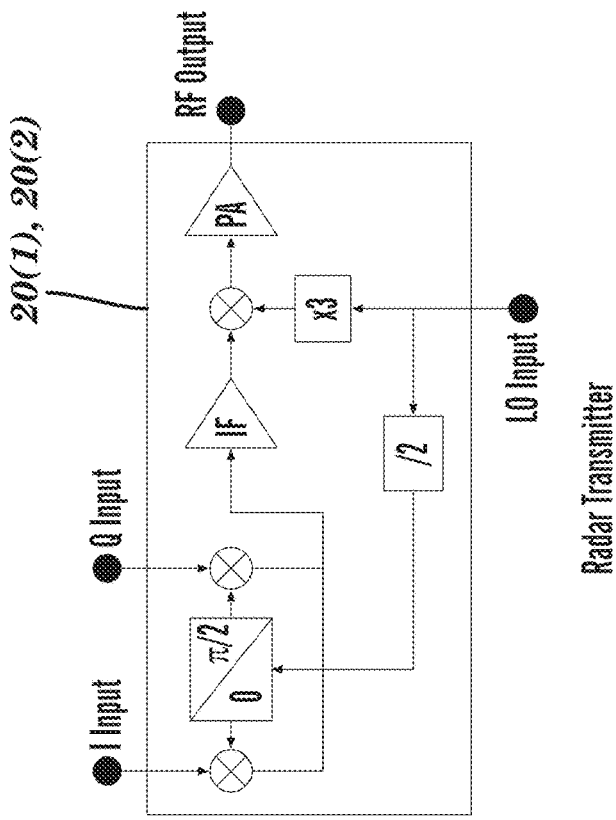
Figure 5:
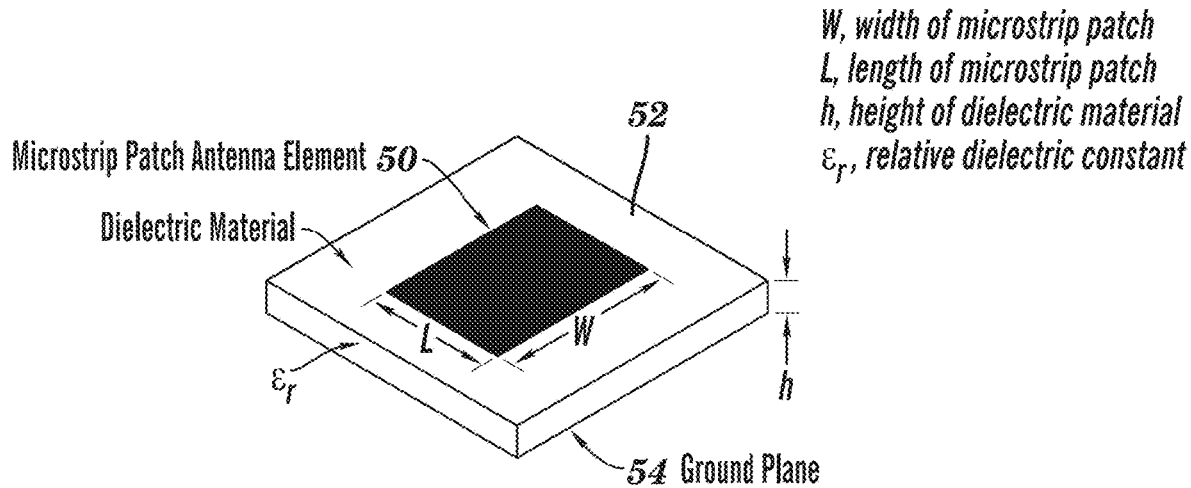
FIG. 5 is a perspective view of an exemplary microstrip patch antenna on a substrate that may be utilized in the exemplary chipless RFID tag showman FIG. 1.

Referring now more specifically to FIGS. 4A, and 4B, examples of the integrated circuit block diagrams for the radar transmitters 20(1) and 20(2) and radar receivers 22(1) and 22(2) are illustrated. In one example, the semiconductor process technology used for the transmitters 20(1) and 20(2) and receivers 22(1) and 22(2) in the RFID reader device 12 is silicon germanium (SiGe), however other semiconductor process technologies may be used in other examples.

Within the integrated circuits of the transmitters 20(1) and 20(2) and receivers 22(1) and 22(2), the LO signal frequency from the local oscillator 24 is divided by two to produce an internal intermediate frequency (IF) signal. The LO signal frequency is also frequency multiplied by 3 to produce a final mixer LO signal. Since the IF frequency tracks any change in the LO frequency, this particular superheterodyne approach is known as a sliding-IF design. The transmitter IF signal is applied in-phase, and in-quadrature phase (delayed by 90° or π/2 radians), to the baseband input mixers, known as the in-phase (I) and quadrature-phase (Q) mixers. The I and Q input mixers for the transmitters 20(1) and 20(2) accept external baseband modulation signals that result in the internal IF signal becoming vector modulated. The I and Q output mixers of the receivers 22(1) and 22(2) are produce demodulated baseband signals at the I and Q outputs.

The LO frequency signal is connected to the divide-by-2 circuit that creates the IF frequency, and the LO frequency signal is also connected to the multiply-by-3 circuit that is in turn connected to the final up conversion mixer such that the relationship of the final carrier frequency is shown in equation (1).

$$fc = 3.5(LO) \quad (1)$$

Therefore, in one example, when the LO is swept from 16.4 GHz to 17.4 GHz, the resulting FMCW signal at the carrier frequency is swept from 57.4 GHz to 60.9 GHz, although other LO frequencies may be utilized to provide other bandwidth sweep ranges such as described above. The I/Q baseband balanced mixers in the transmitters 20(1) and 22(2) require I and Q baseband signals in order to produce an IF modulated signal at the outputs.

The use of pairs of transmitter 20(1) and receiver 22(1) for the vertical channel 36, and transmitter 20(2) and receiver 22(2) for the horizontal channel 34 requires the ability to distinguish the vertical carrier signal from the horizontal carrier signal. In this example, the method employed to distinguish the vertical carrier signal from the horizontal carrier signal is provided by a frequency offset, or shift, by controlling the baseband modulating signals generated from the fixed frequency synthesizer 26, although other methods may be employed.

In this example, referring again to FIG. 2A, the transmitters 20(1) and 20(2) are also coupled to the frequency synthesizer 26. The vertical polarization transmitter 20(1) is driven by I and Q baseband signals in quadrature, meaning the I signal is at zero phase reference (cosine) and the Q signal is driven at 900 or π/2 radians phase delay (sine) at a fixed frequency of 99.96 MHz from the frequency synthesizer 26, although other frequencies may be employed. In this example, the horizontal polarization transmitter 20(2) is driven by I and Q baseband signals also in quadrature at a fixed frequency of 100.00 MHz from the frequency synthesizer 26, but other frequencies may be used. The vertical polarization and horizontal polarization carrier frequencies for the transmitters 20(1) and 20(2) are therefore offset by 40 kHz in this example, which provides a method for identifying the receive vertically polarized signals and the receive horizontally polarized baseband signals at the final SAR processing stage, as described in further detail below. Other baseband signal frequencies may be utilized that would result in other offset frequencies.

Referring now to FIG. 2B, a block diagram of the subcarrier down conversion, data acquisition, and signal processing parts of the RFID reader device 12 performed by the RFID reader computing device 32 is illustrated. In this example, receiver I and Q baseband output signals for both the vertical channel 36 and the horizontal channel 34, centered at 99.60 MHz and 100.00 MHz respectively, are down converted by baseband mixers 28 to low frequency signals, denoted as subcarrier baseband signals, which are then filtered using low pass filters 30 and are connected to the RFID reader computing device 32. By using a 100.01 MHz fixed frequency LO signal in this example, generated from the fixed frequency synthesizer 26 connected to the baseband mixers 28, the resulting subcarrier frequency for the signal from the vertical polarization receiver 22(1) is centered at 50 kHz (100.01 MHz−99.96 MHz=50 kHz), while the resulting subcarrier frequency for the signal from the horizontal polarization receiver 22(2) is centered at 10 kHz (100.01 MHz−100.00 MHz=10 kHz), although other subcarrier frequencies may be utilized.

By utilizing the down conversion to the low frequency subcarrier baseband signals, the frequency content of interest is in the spectral region well below 100 kHz, which allows the RFID reader computing device 32 to operate at a low sampling rate. Using a low sample rate for the analog to digital conversion in the RFID reader computing device 32 allows efficient digital signal conversion at a low cost. In one example, the sample rate of the RFID reader computing device 32 is 200 kHz, allowing up to 100 kHz spectral content to be sampled. In this example, in order to prevent signal aliasing of any signal energy above 100 kHz, the low pass filters 30 shown in FIG. 2B have a roll-off corner of 80 kHz, although other frequencies may be employed for the roll-off corner. The RFID reader computing device 32 converts the analog subcarrier baseband signals to discrete digital samples that are stored and processed by the SAR signal processing software algorithms that may be implemented in the RFID reader computing device 32, by way of example. In one example, the RFID reader computing device 32 is a microcomputer or integrated circuit that may be located on the same chip as the antenna elements 16(1), 16(2), 18(1), and 18(2) for the FMCW radar, but other devices may be used such as a digital signal processor (DSP) or a field programmable logic array (FPGA) by way of example only.

Figure 2C:
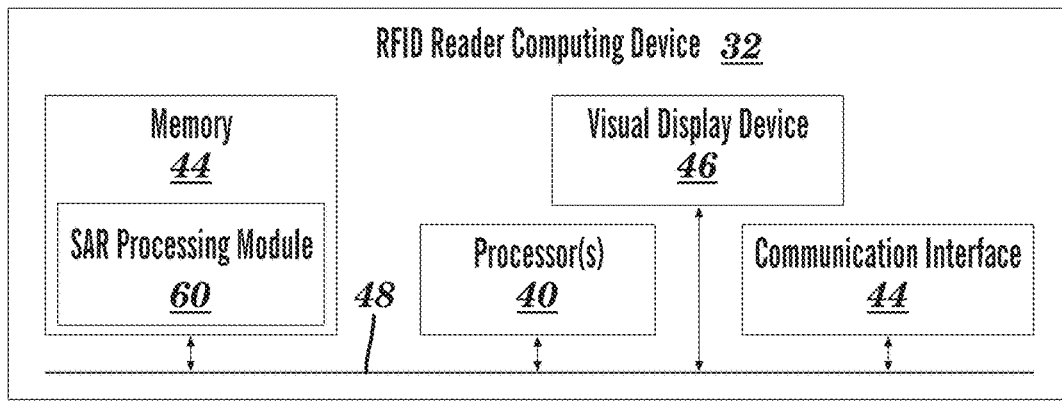
FIG. 2C is a block diagram of an exemplary computing device of the RFID reader device of the present technology shown in FIG. 2B.

Referring now to FIG. 2C, in one example, the RFID reader computing device 32 includes one or more processor(s) 40, a memory 42, a communication interface 44, and/or a visual display device 46, which are coupled together by a bus 48 or other communication link, although the RFID reader computing device 32 can include other types and/or numbers of elements in other configurations. In one example, the RFID reader computing device 32 is a microcontroller located on the same chip as the millimeter wave RFID reader device 12.

The processor(s) 40 of the RFID reader computing device 32 may execute programmed instructions stored in the memory 42 for the any number of the functions described and illustrated herein. In one example, the processor(s) 40 provides instructions for receiving SAR radar image data from the receivers 22(1) and 22(2) and processes the radar image data to decode information stored on chipless RFID tags, such as RFID tag 14 shown in FIG. 1, as described further below. The processor(s) 40 may include one or more CPUs, GPUs, or general purpose processors with one or more processing cores, for example, although other types of processor(s) can also be used.

The memory 42 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 40, can be used for the memory 42.

Accordingly, the memory 42 of the RFID reader computing device 32 can store one or more applications or programs that can include computer executable instructions, such as SAR processing module 60, that when executed by the RFID reader computing device 32, cause the RFID reader computing device 32 to perform actions described below. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the image acquisition computing device. The communication interface 44 operatively couples and communicates between the RFID reader computing device 32 and the transmitters 20(1) and 20(2) and the receivers 22(1) and 22(2). The visual display device 46 may be any visual display configured to display the generated radar images.

In another example, the RFID reader computing device 32 is a highly integrated microcontroller device with a variety of on-board hardware functions, such as analog to digital converters, digital to analog converters, serial buses, general purpose I/O pins, RAM, and ROM. The microcontroller may be located on the same chip as the transmitters 20(1) and 20(2) and receivers 22(1) and 22(2) of the RFID reader device 12, by way of example.

Although the exemplary RFID reader computing device 32 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the RFID control computing device 32. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Referring now more specifically to FIGS. 1-9, an example of the system of the present technology includes the chipless RFID tag 14 that may be employed with the RFID reader device 12 described above, although the system may include any number of RFID tags. In this example, RFID tag is chipless, i.e., it does not include its own integrated circuit and is non-powered. Referring to FIG. 6, a portion of the RFID tag 14 is illustrated. In this example, the RFID tag 14 includes one or more microstrip patch antenna elements 50 that are formed on a substrate 52 of the RFID tag 14, although the RFID tag 14 may include other types and/or numbers of microstructures located on the substrate 52. As described in further detail below, the microstrip patch antenna elements 50 are oriented and have dimensions to provide polarization and phase information representative of the information encoded on the RFID tag 14, which can be read-out by the RFID reader device 12. The microstrip patch antenna elements 50 re-radiate radiofrequency signals received from the RFID reader device 12 back to the RFID reader device 12 to form a radar image.

Construction of the chipless RFID tag 14 in the examples of the present technology uses the microstrip patch antenna as the fundamental encoding element. Referring again to FIG. 5 an exemplary microstrip patch antenna element 50 in relation to the substrate 52 used as the RFID label is shown. Those of ordinary skill in the art of microstrip patch antenna design will be familiar with the technique for design and construction. The equations below determine the physical dimensions of width, W, and length, L, of the microstrip patch antenna element 50 as a function of the dielectric constant of the substrate material ($\varepsilon R$), the thickness of the substrate (h), and the operating frequency ($f_o$).

$$\text{Width} = \frac{c}{2f_o\sqrt{\frac{\varepsilon_R+1}{2}}}; \varepsilon_{eff} = \frac{\varepsilon_R+1}{2} + \frac{\varepsilon_R-1}{2}\left[\frac{1}{\sqrt{1+12\left(\frac{h}{W}\right)}}\right] \quad (2)$$

$$\text{Length} = \frac{c}{2f_o\sqrt{\varepsilon_{eff}}} - 0.824h\left(\frac{(\varepsilon_{eff}+0.3)\left(\frac{W}{h}+0.264\right)}{(\varepsilon_{eff}-0.258)\left(\frac{W}{h}+0.8\right)}\right)$$

The substrate 52 material or label stock also has a conductor on the opposite side which acts as a ground plane 54. Using the microstrip patch antenna 50 with the ground plane 54 allows the RFID tag 14 to be placed on any item even if the item is electrically conductive, such as metal containers, cans, and liquid containers without affecting the properties of the antenna elements.

The microstrip patch antenna element 50 of the examples of the present technology may be printed using any conductive material. As set forth below, examples of the system of the present technology rely on antenna reradiation, which does not require high electrical conductivity printing material to create the microstrip patch antenna elements 50. Prior art devices that use spectral signature or resonance detection, limits the number of discernable spectral signature states on resonate frequency discrimination, which in turn depends on the circuit resonance quality (Q) factor. The Q factor is directly dependent on the electrical conductivity and is mainly determined by the physical relation of the ratio of inductive reactance ($X_L$) to the resistance (R), as shown in equation (3).

$$Q = \frac{X_L}{R} \quad (3)$$

The specific electrical resistance of a material is specified by its resistivity, and is measured in ohm-m ($\rho$), but often when specifying a material's ability to conduct electricity, the inverse of resistivity, or conductivity ($\sigma$) is used. The unit of conductivity is measured in siemens per meter (S/m). It is important to note that in prior art devices that detect spectral signature states, the dependence on materials with very high conductivity, such as silver, is needed to achieve maximum spectral signature or resonant frequency discrimination.

In examples of the present technology, which use antenna re-radiation in the SAR RFID system 10, a useful characteristic measurement for a target, or tag microstrip patch antenna element 50, is the radar cross section (RCS). RCS is a measure of the target's ability to reradiate and reflect the radar energy that illuminates the antenna element area. Those of ordinary skill in the art of radar engineering use RCS as a deterministic method to compare various radar targets in the ability to efficiently reradiate and reflect the impinging radar electromagnetic energy.

Figure 11:
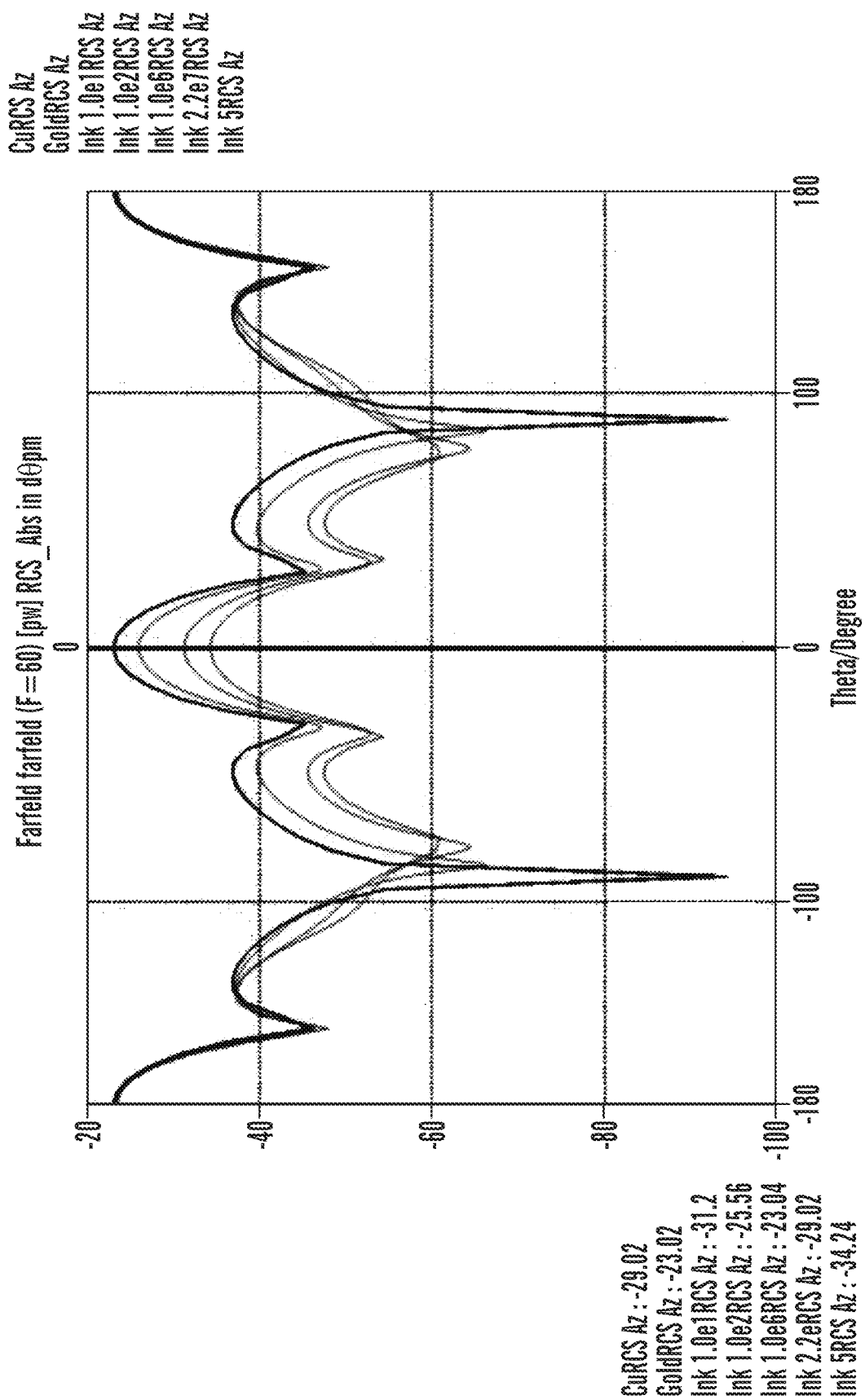
FIG. 11 illustrates a simulation of the radar cross section of a conductive sheet as a function of sheet electrical conductivity for various materials.

Simulation of the RCS of a conductive sheet as a function of sheet electrical conductivity illustrates the relative independence of the RCS with respect to the sheet electrical conductivity. Referring to FIG. 11, the results of simulating a 10 mm×10 mm×1 μm conductive sheet at 60 GHz are shown, illustrating that even with material conductivities as poor as those from zinc, nickel, lead, or even iron do not change the RCS values.

Figure 12:
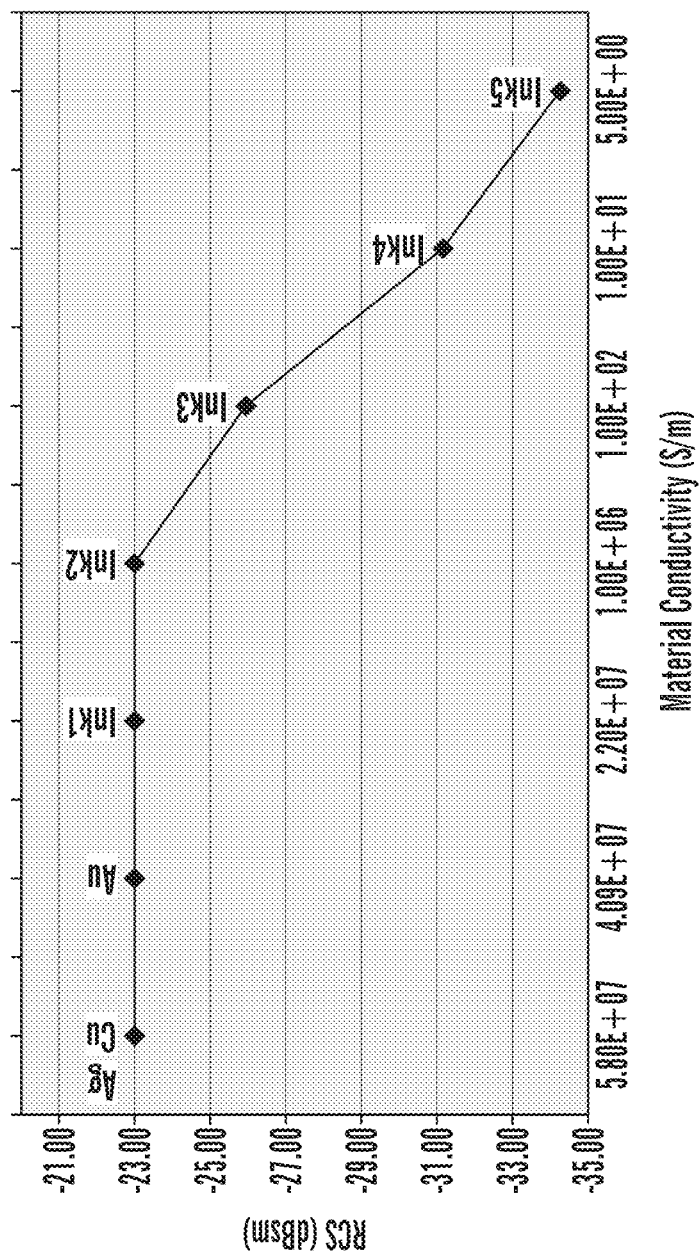
FIG. 12 is a graph of material conductivity versus RCS for various materials and an associated table of material conductivities.

The graph in FIG. 12, and the associated table of material conductivities shows that inks for printed microstrip patch antenna structures 50 can use a wide variety of low-cost conductive materials without impacting the RCS value, and therefore without impact to the re-radiation signal strength in the SAR radar RFID system 10. Arbitrary conductivities were chosen for "ink" values from $2.2\times10^7$ down to 5.0. Any value for the conductivity greater than $1.0\times10^6$ results in the same RCS value. Thus, various conductive materials may be used to print the microstrip patch antennas 50 of the present technology, which significantly reduces the costs to produce the chipless RFID tag 14 employed in the RFID system 10 of the present technology.

Referring again to FIG. 1, examples of the present technology use increased operating frequencies, i.e., 60 GHz to 240 GHz, or up to 1 THz, for the RFID reader device 12, as described above, which reduces the wavelength of the RFID system 10. This allows for manufacturing the chipless RFID tag 14 with increased bit densities. As set forth above, recent technological advances in silicon technology has enabled the ability to produce operating radars at frequencies as high as 240 GHz, with the associated wavelength ($\lambda$) reduced to 1.25 mm, such as disclosed in Bredendiek, C. et al., "A 240 GHz single-chip radar transceiver in a SiGe bipolar technology with on-chip antennas and ultra-wide tuning range," IEEE Radio Frequency Integrated Circuits Symposium (2013) and "High-Resolution 240 GHz Radar with SiGe Chip", Fraunhofer Institute for High Frequency Physics and Radar Techniques FHR (2018), the disclosure of which is hereby incorporated by reference in its entirety.

Referring again to FIG. 5, using microstrip patch millimeter wave antenna elements 50 printed on the RFID tag 14, with element dimensions on the order of ½ $\lambda$, a greater quantity of tag elements can be achieved in a given area compared with lower frequency resonant lumped-element circuits or meandered strip lines. Further, by using microstrip patch antenna elements 50 rather than circuit resonators based on either lumped-element or strip line geometries, control of polarization and phase parameters is used to significantly increase the number of encoded bits per element.

For practical size and bit densities to be considered using various SAR types of technologies, frequencies are described in examples of the present technology, but not limited to, the range of 60 GHz up through 240 GHz. Over this millimeter wave frequency range, practical SAR RFID chipless tag 14 tradeoff bit density versus state of the art tag element printing resolution. As conductive or metallic printing technology moves forward with higher resolution capabilities, the higher millimeter wave frequencies, and corresponding smaller wavelengths, can be used to create higher bit densities.

Figure 6A:
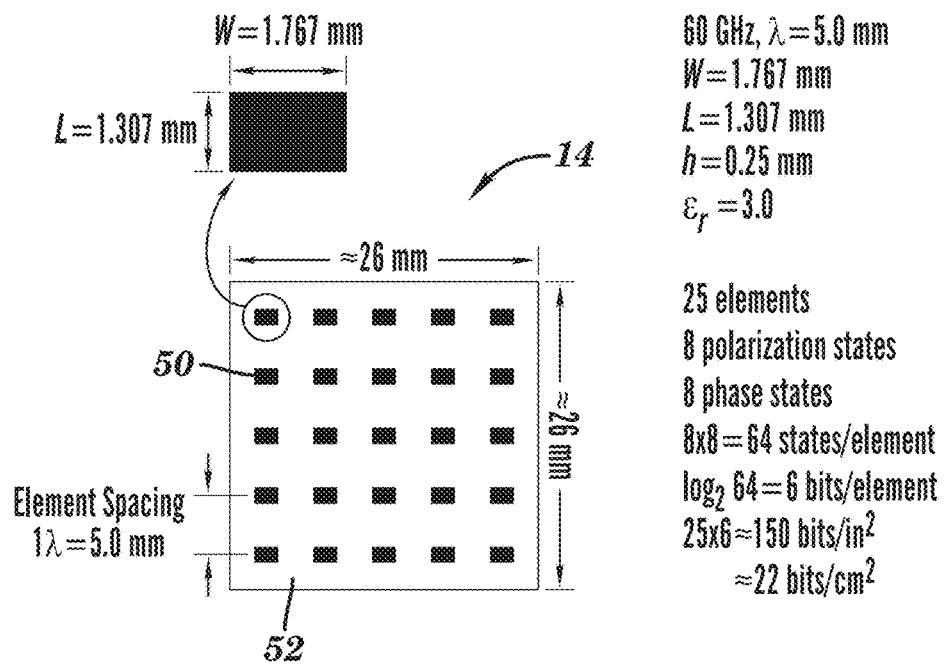
FIG. 6A is a schematic view of an exemplary RFID chipless tag using 60 GHz as the SAR radar frequency.

Referring now more specifically to FIG. 6A, as an example, an RFID system operating at a millimeter wave frequency of 60 GHz, with λ=5.0 mm, a practical ½ λ microstrip patch antenna element 50 printed on a dielectric or label substrate 52 with a thickness of 0.25 mm material has a printed dimension of 1.8 mm×1.3 mm. The substrate or label material has an associated electrically conductive ground plane layer on the opposing side to the microstrip patch antenna elements 50, and the dielectric constant is 3.0 in this example. The impedance and size of the microstrip patch antenna elements 50 are controlled by the thickness and dielectric constant of the dielectric material used for the substrate 52.

Maintaining low inter-element coupling allows the ability to image and resolve the phase and polarization states of each element independently within an array of multiple elements. At an element size of 1.8 mm×1.3 mm, with optimal low intercoupling antenna element spacing of 1λ, or 5.0 mm, 25 elements can be printed within an approximate 1 square inch (6.8 square cm) area. In this example at 60 GHz, the total bit density is 25 elements/square inch. With a 64 state encoding scheme for polarization and phase described below producing 6 bits/element of encoding density, 25 elements/square inch×6 bits/element provides approximately 150 bits/square inch (approximately 22 bits/square centimeter) of encoding bit density in this example.

FIG. 6A illustrates an array of microstrip patch antenna elements 50 on a representative RFID tag 14 operating in RFID system 10 at 60 GHz with dimensions indicated. The specific microstrip patch antenna elements 50 shown in the drawing are for reference only so as to indicate relative position and spacing between the microstrip patch antenna elements 50. A typical printed tag will have different antenna element rotational orientations for encoding polarization states and different antenna phase tails for encoding phase states as described below.

Figure 6B:
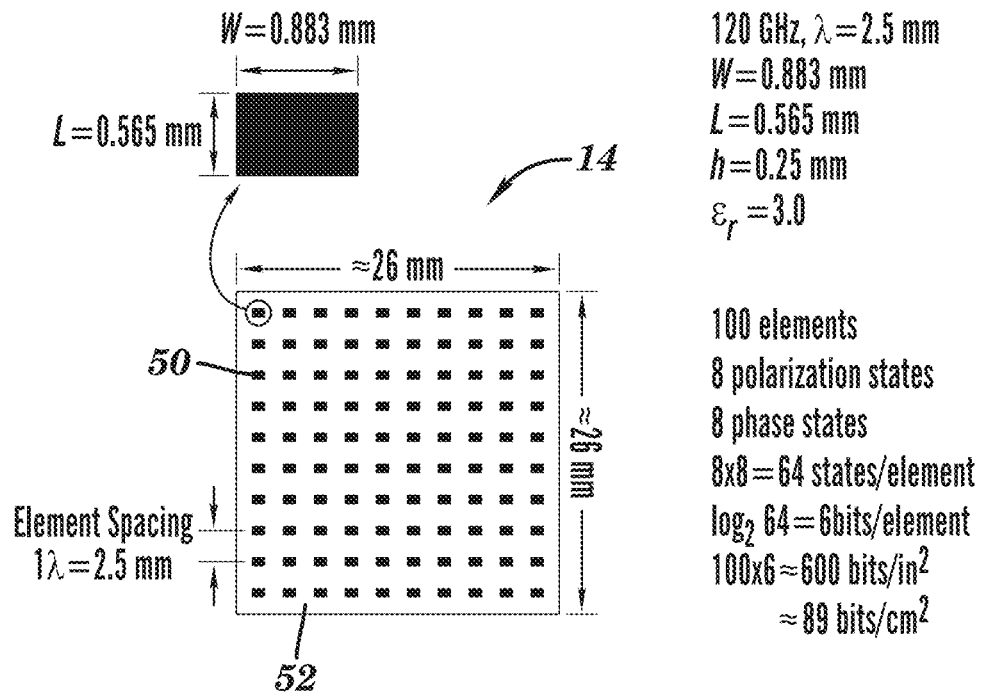
FIG. 6B is a schematic view of an exemplary RFID chipless tag using 120 GHz as the SAR radar frequency.

Referring now more specifically to FIG. 6B, in another example, RFID system 10 operates at a frequency of 120 GHz, with λ=2.5 mm, a practical ½ λ microstrip patch antenna element 50 printed on the dielectric or label substrate 52 with a thickness of 0.25 mm material has a printed dimension of approximately 0.9 mm×0.6 mm. With an element spacing of 1λ, or 2.5 mm, 100 elements can be printed within approximately 1 square inch area. With the 64 state encoding scheme for polarization and phase described below producing 6 bits/element of encoding density, 100 elements/square inch×6 bits/element provides approximately 600 bits/square inch (approximately 89 bits/square centimeter) of encoding bit density.

In FIG. 6B, an array of microstrip patch antenna elements 50 on a representative tag substrate 52 is shown for RFID system 10 operating at 120 GHz. Note that by reducing the associated wavelength by ½ relative to the 60 GHz system, that approximately four times the number of elements can be printed in an equivalent tag area.

Figure 6C:
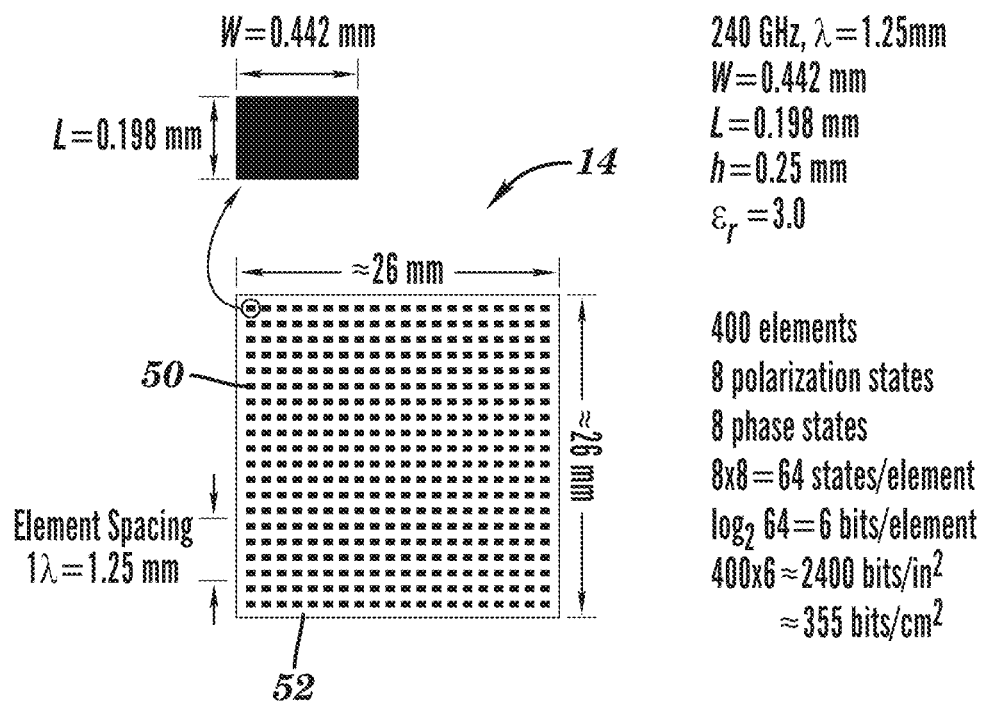
FIG. 6C is a schematic view of an exemplary RFID chipless tag using 240 GHz as the SAR radar frequency.

Referring now to more specifically to FIG. 6C, in yet another example, RFID system 10 operates at a frequency of 240 GHz, with λ=1.25 mm, a practical ½ λ microstrip patch antenna element 50 printed on the dielectric or label substrate 52 with a thickness of 0.25 mm material has a printed dimension of 0.4 mm×0.2 mm. With an element spacing of 1λ, or 1.25 mm, 400 elements can be printed within approximately 1 square inch area. With the 64 state encoding scheme for polarization and phase described below producing 6 bits/element of encoding density, 400 elements/square inch×6 bits/element provides approximately 2400 bits/square inch (approximately 355 bits/square centimeter) of total encoding bit density.

In FIG. 6C, an array of microstrip patch antenna elements 50 on a representative tag is shown for RFID system 10 operating at 240 GHz. The current system constraint on higher frequency, and shorter associated wavelength, RFID systems is limited by the printing resolution for placing the conductive materials onto the tag substrate 52. As printing technologies advance that can produce higher resolution tag elements, higher frequency chipless RFID systems can be developed and utilized with this technology. Examples of this technology may utilize RFID SAR operating frequencies up through 1 THz.

As can be seen from this relationship between tag encoding bit density and operating frequency, as the operating frequency is doubled, the total bit density of the RFID tag 14 is quadrupled. Achieving higher bit densities requires printing the greatest allowable number of microstrip patch antenna elements 50 in a given area on the chipless RFID tag 14. As the distance between microstrip patch antenna elements 50 is decreased in order to increase the number of elements per tag area, there can be inter-element coupling that can reduce the detection of the individual element polarization and phase states for the microstrip patch antenna elements 50. The main contributing mechanism to inter-element coupling at millimeter waves is surface wave propagation along the surface of the dielectric substrate 52. In examples of the present technology, the inter-element coupling is reduced by spacing the microstrip patch antenna elements 50 at least 1 wavelength (1λ) apart on the chipless RFID tag 14, but other methods of reducing the inter-element coupling may be employed. Since the wavelength dimension at millimeter waves is relatively small in comparison with typical chipless RFID tag sizes, the number of elements that can be printed achieves high bit densities.

Referring again to FIG. 5, the microstrip patch antenna element 50 has an inherent polarization, or E-field orientation. In this example, the polarization state of the microstrip patch antenna element 50 is one of the variables used to encode information on the RFID tag 15. By printing the microstrip patch antenna element 50 with different rotational orientations, different polarization states will be exhibited relative to the reader orientation. In examples of the present technology, up to 8 discrete rotational orientations representing up to 8 polarization states are utilized, but in other examples more polarization states are possible.

Figure 7:
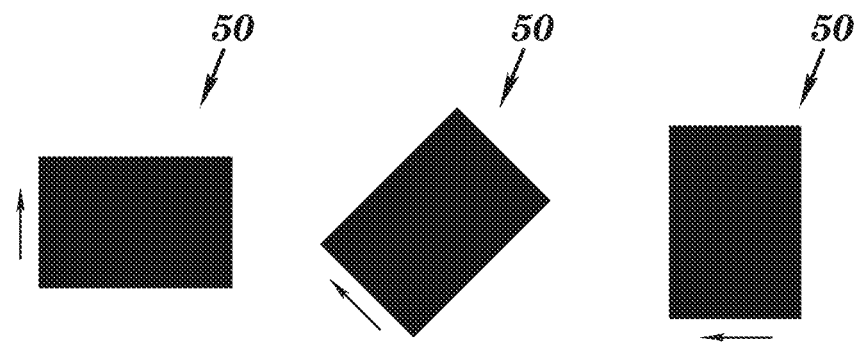
FIG. 7 shows exemplary polarization state orientations that may be utilized for the microstrip patch antenna elements located on the exemplary RFID chipless tag of the present technology.

Referring to FIG. 7, examples of the microstrip patch antenna elements 50 with different rotational orientations are illustrated. The arrows represent the E-field direction that defines the antenna element polarization. In the present invention, the fully polarimetric SAR RFID device 12, as described above, allows detection of the polarization state of the target microstrip patch antenna element 50.

Figure 8:
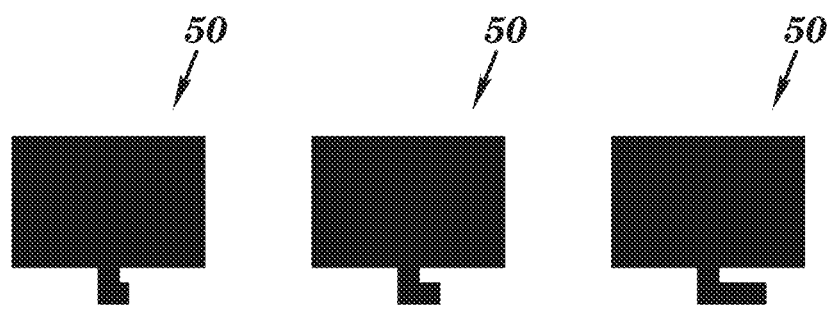
FIG. 8 shows exemplary elements that may be utilized to determine the phase state for the microstrip patch antenna elements located on the exemplary RFID chipless tag of the present technology.

Referring now to FIG. 8, the other parameter used for encoding information into the microstrip patch antenna elements 50 is the phase state of the microstrip patch antenna elements 50. In examples of the present technology, control of the microstrip patch antenna phase state is achieved through the use of small transmission line "tails" added to the patch as shown in FIG. 8, but other methods of phase control are contemplated. By way of example only, other geometries may be utilized to provide phase control. In this example, the length of the added tail sets the phase delay response of the microstrip patch antenna element 50. Tails with shorter lengths will have shorter delay response times or lower phase delay, while tails with longer lengths will have longer phase delay times. In examples of the present technology, up to 8 discrete tail lengths represent up to 8 discrete phase states but in other examples more phase states are possible.

Figure 9:
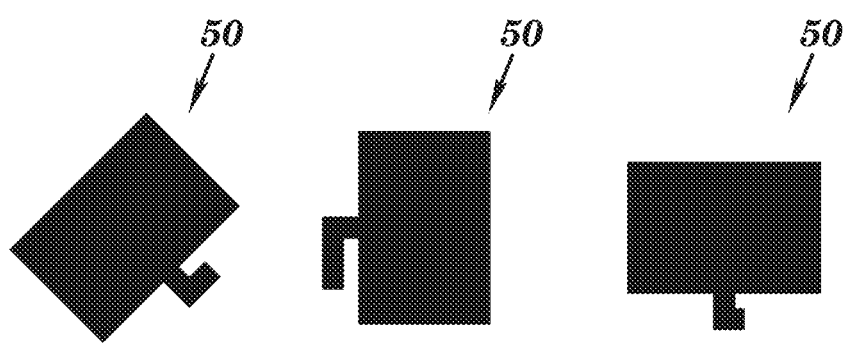
FIG. 9 shows exemplary polarization and phase state combinations that may be utilized for the microstrip patch antenna elements located on the exemplary RFID chipless tag of the present technology.
Figure 10:
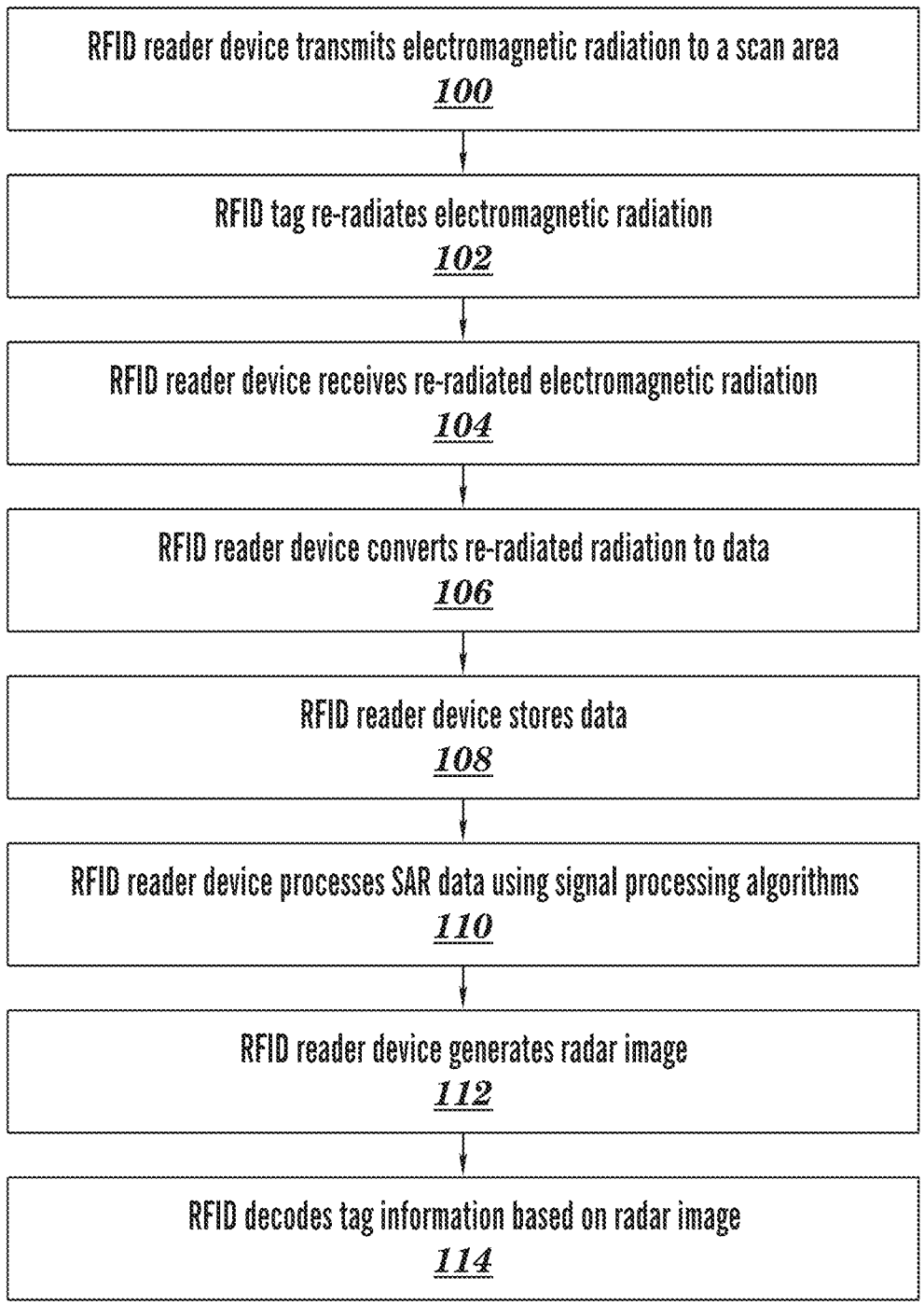
FIG. 10 is a flowchart of an exemplary inverse synthetic aperture radar (SAR) processing method of the present technology.

Referring now of FIG. 9, exemplary microstrip antenna elements having both a polarization state and a phase state as described above are illustrated. By combining the polarization states and phase states for the microstrip patch antenna elements 50 on the chipless RFID tag 14, both parameters can be used for encoding data. In examples of the present technology, up to 8 polarization states and up to 8 phase states combinatorically provide 64 (8×8) unique states per microstrip patch antenna element 50, but more polarization and phase states are contemplated. The number of binary bits represented by 64 states is found by $\log_2 (64)=6$ bits per element.

An exemplary operation of the RFID system 10 of examples of the present technology will now be described with reference to FIGS. 1-10B. The SAR image processing described below with polarization and phase discrimination is used for any of the above types of SAR radar architectures.

First, in step 100 the RFID reader device 12 transmits electromagnetic radiation from transmitters 20(1) and 20(2) to a scan area through the transmit antennas 16(1) and 16(2). The electromagnetic radiation is provided at the sweep frequency determined by the local oscillator 24. In one example, the RFID reader device 12 provides a 60 GHz FMCW radar that is swept from 57.4 GHz to 60.9 GHz, or a 3.5 GHz sweep bandwidth. In another example, the RFID reader device 12 uses a 60 GHz FMCW radar that is swept from 57 GHz to 71 GHz, or a 14 GHz sweep bandwidth. In yet another example, the RFID reader device 12 uses a 120 GHz FMCW radar that is swept from 110 GHz to 130 GHz, or a 20 GHz sweep bandwidth. And in a further example, the RFID reader device 12 provides a 240 GHz FMCW radar is swept from 220 GHz to 260 GHz, or a 40 GHz sweep bandwidth, although other frequencies may be employed. The electromagnetic radiation is polarized through the horizontal transmitter 20(2) and the vertical transmitter 20(1) such that the system is fully polarimetric.

In order to generate the synthetic aperture, either the chipless RFID tag 14 or the RFID reader device 12 are in motion, although other methods may be employed. In a wide sweep bandwidth ISAR mode, the axis of rotation or a linear movement of the RFID tag 14, such as in a conveyor system, will be at an angle of inclination (incidence angle) which will yield high range resolution that will enable two dimensional tag element imaging capability. The inclined angles may be used in wide sweep bandwidth SAR modes, such as a drone carrying the radar platform for larger area RFID logistics applications.

Figures 13, 14:
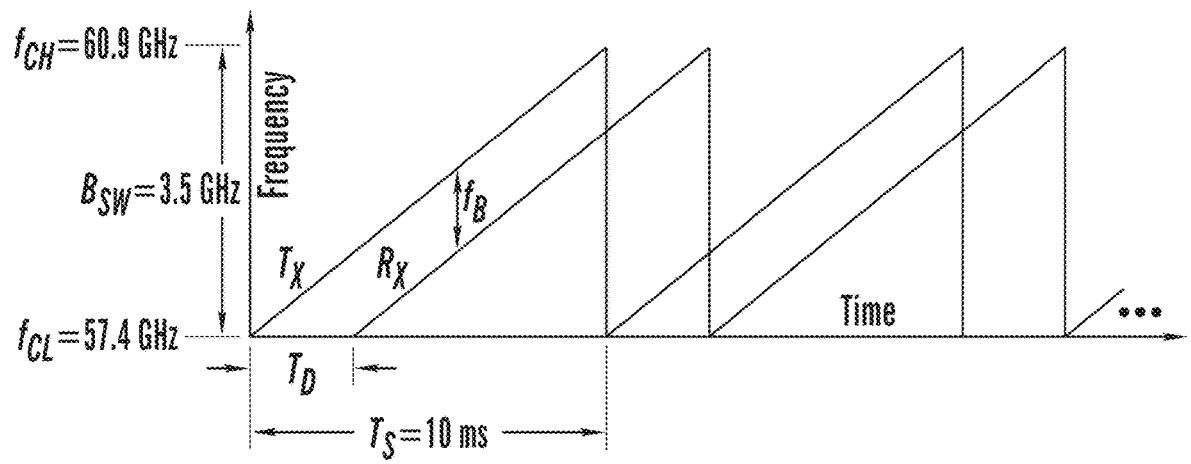
FIG. 13 is a graph of parameters for sweep bandwidth ($B_{SW}$) and sweep time ($T_s$) for the exemplary RFID reader device of the present technology.
FIG. 14 is an exemplary of digital data from the exemplary RFID reader device.

Next, in step 102 the electromagnetic radiation is received at the RFID tag 14 in the scanned area, although the scanned area may include any number of RFID tags, causing the micropatch antenna element structures 50 of the RFID tag 14 to resonate at the desired frequency and re-radiate the electromagnetic signals back toward the RFID reader device 12. In an FMCW radar system with relatively short distances (R) from the radar (RFID reader device 12) to the target (chipless RFID tag 14), the typical difference between the transmitter and receiver frequency, known as the FMCW beat frequency, is low enough to be sampled easily by a low sample rate analog to digital converter. This is the main advantage of using FMCW for short range applications such as SAR RFID systems where distances range from a few cm up to tens of meters. In an example, the FMCW parameters for sweep bandwidth ($B_{SW}$) and sweep time ($T_S$), also known as the chirp time, are shown in FIG. 13.

Figure 15:
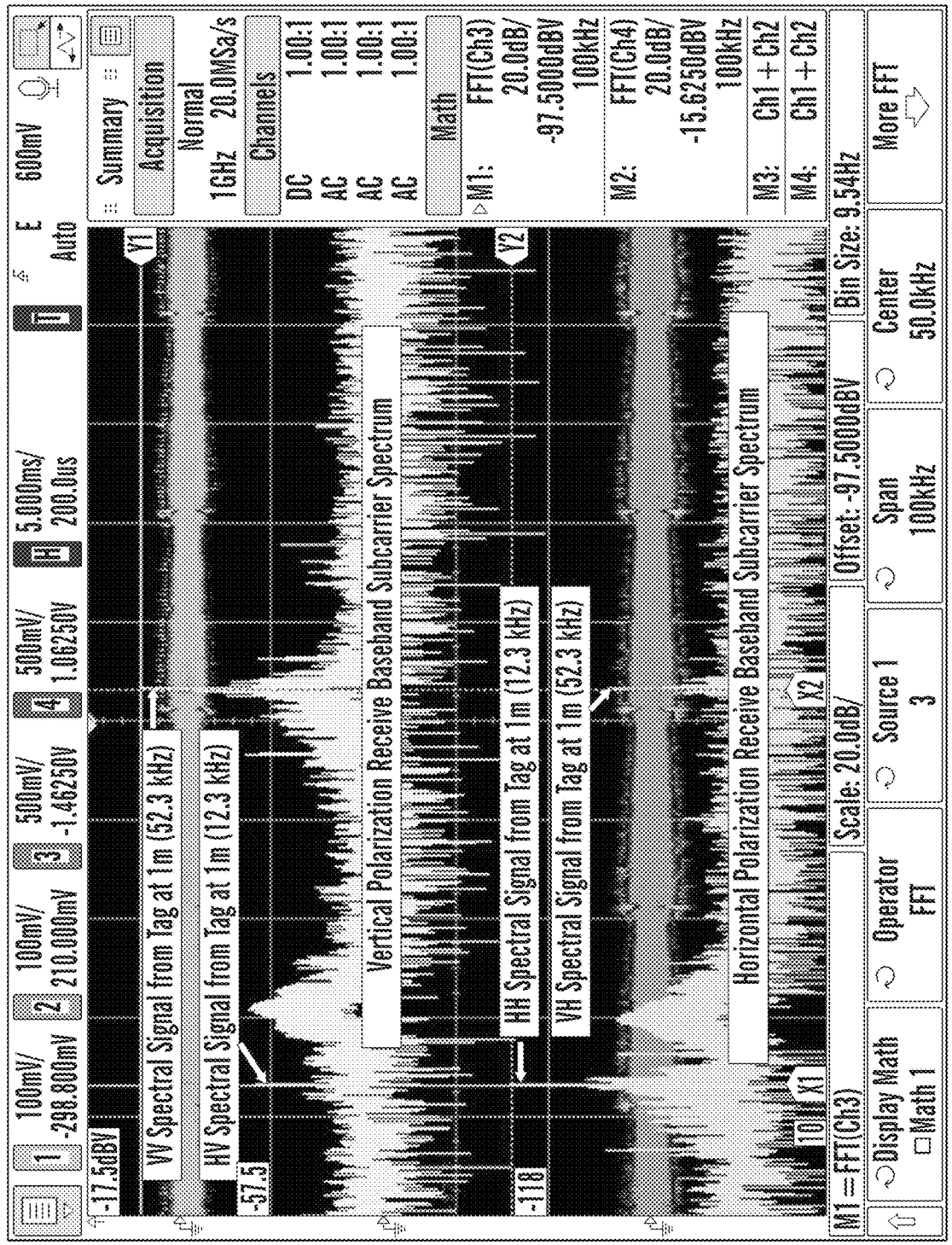
FIG. 15 is an exemplary spectrum for a SAR imaging analysis.

Those of ordinary skill in the art of FCMW radar will be familiar with the equations that define FCMW parameters. The round-trip delay time ($T_D$), which determines the difference between the receive frequency and the transmit frequency is found by equation (4), where c is the speed of light, and R is the range or distance between the radar and the target, as shown in FIG. 15.

$$T_D = \frac{2R}{c} \quad (4)$$

The difference between the FMCW transmit frequency and receive frequency is also known as the beat frequency ($f_B$). The beat frequency is a function of the sweep bandwidth ($B_{SW}$), the time delay ($T_D$) and the chirp time ($T_s$) as shown in equation (5).

$$f_B = \frac{B_{SW} T_D}{T_S} \quad (5)$$

In an example, SAR RFID system 10, with a range (R) of 1 m from the RFID reader device 12 to the RFID tag 14, the round-trip time delay comes out to 6.67 ns. In the example SAR RFID system 10 with the FMCW sweep parameters as shown in FIG. 13, the beat frequency, fb is equal to 2.34 kHz. In an example, the FMCW transmitter quadrature baseband signaling frequency for the vertical polarization channel is 99.96 MHz, and the quadrature baseband signaling frequency for the horizontal polarization channel is 100.00 MHz, and the subcarrier baseband conversion LO frequency is 100.01 MHz. The down converted subcarrier baseband frequency for the vertical polarization channel 36 is 50 kHz, and the down converted subcarrier baseband frequency for the horizontal polarization channel 34 is 10 kHz. The receive beat frequency (fB) is added to the subcarrier frequency values and in the example system, with a 1 meter tag distance, the final subcarrier frequency for the vertical polarization channel is 52.34 kHz, and for the horizontal polarization channel is 12.34 kHz, although other frequencies may be employed.

In step 104, re-radiated electromagnetic radiation from the chipless RFID tag 14 is received by the receivers 22(1) and 22(2) through receiver antennas 18(1) and 18(2), respectively, and converted to subcarrier signals in the down conversion process described above, although other methods may be employed.

Next, in step 106 the RFID reader computing device 32 converts the received subcarrier signals from the signal from the vertical polarization receiver 18(1) and the signal from the horizontal polarization receiver 18(2) into data. In one example, the RFID reader computing device 32 samples and converts the voltage levels into digital values at a rate of 200 kilo-samples per sec, or 200 kS/s. The sequence of stored data samples is known in the art as the phase history. A small segment of a stored sample file illustrating a phase history is shown in FIG. 14. The first column shows the sample sequence number, and remaining columns show the digital values of the voltages taken at each sample instance for the vertical polarization I-channel, vertical polarization Q-channel, horizontal polarization I-channel and the horizontal polarization Q-channel.

The standard nomenclature used in SAR polarimetric radar is to specify the transmit polarization and receive polarization by a two letter acronym, using V for vertical polarization and H for horizontal polarization. In referring to the aspect of a polarimetric radar system that transmits the vertical polarization signal and receives the vertical polarization signal, the designation is VV. For the aspect of the polarimetric radar that transmits the vertical polarization signal and receives the horizontal polarization signal, the designation is VH. The four aspect signal descriptions are VV, HH, HV and VH, which account for all combinations of transmit and receive polarization signals.

Next, in step 108 the data from the RFID reader computing device 32 is stored, processed and displayed for interpretation by the RFID reader computing device 32. In one example, visual display of the decoded SAR images is used to demonstrate tag element decoding, although other methods of data representation, communication, and storage may be used, such as RFID data base analysis for inventory control, and logistics and cloud storage for archiving by way of example only.

Next, in step 110 SAR signal processing algorithms use the different combinations of signal polarizations to detect and discriminate the polarization signatures and the phase signatures across the spatial domain of the target or RFID tag 14. An exemplary subcarrier spectrum for both polarizations is shown in FIG. 15. The ISAR (in the case of a moving chipless RFID tag 14) signal processing is implemented through software algorithms that process the stored data samples acquired through the RFID reader computing device 32. In an example, the receiver I and Q output subcarrier signal voltage levels for both the vertical and horizontal polarization channels range from a few millivolts up to approximately ½ volt peak to peak. The frequency span of the subcarrier voltage signals range up through 80 kHz, depending upon the distance to the RFID tag 14.

Once the data samples are stored, the SAR processing begins. In step 112, the RFID reader computing device 32 generates a radar image based on the re-radiated electromagnetic radiation. In this example, the polarization decoding and phase decoding of the re-radiated radiation from the RFID tag 14 may be represented as radar images. The polarization and phase decoding images may be stored and sent to various RFID back-end system data bases for application specific uses. The data obtained from the subcarrier signals is loaded by the RFID reader computing device 32 and the RFID reader computing device 32 extracts the data and separates the data based on the transmit and receive polarizations in the four categories (VV, VH, HV, HH). In this example, the RFID reader computing device 32 then generates radar images based on the four different categories of transmit and receive polarizations.

Next, in step 114, the image data may then be used to extract polarization and phase data for individual micropatch antenna element structures 50 on the chipless RFID tag 14 to decode the information on the RFID tag 14. In one example, images can be generated to represent the polarization and phase, although other methods of identifying polarization and phase may be utilized. The polarization data and phase data are then decoded to extract the data stored on the tag.

Example

A 60 GHz radar transmitter and 60 GHz radar receiver were built from silicon germanium (SiGe) application specific integrated circuit (IC) technology both architected as double conversion superheterodyne devices.

Figure 16:
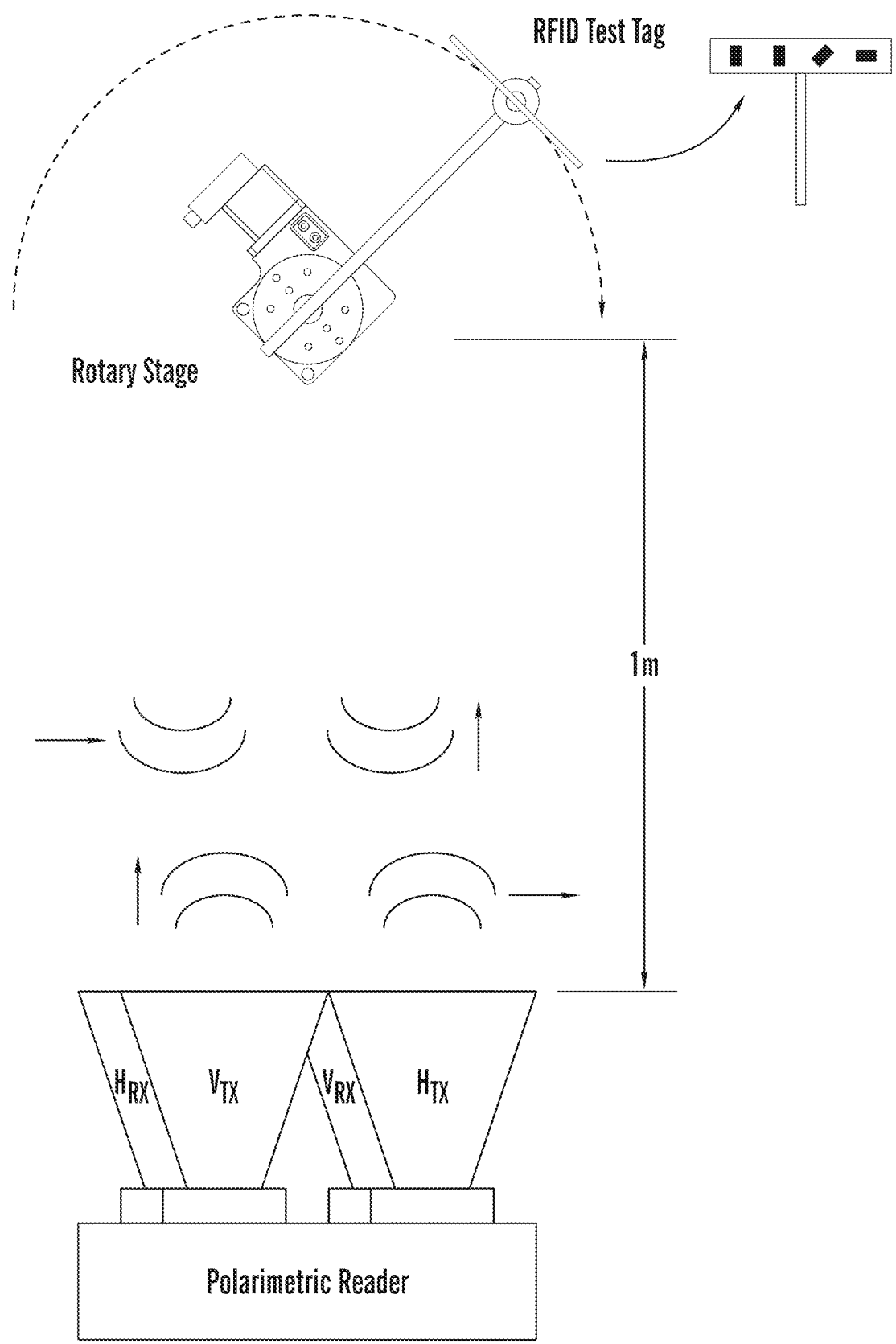
FIG. 16 is an exemplary experimental setup for generating SAR images in accordance with the present technology.

A single row of tag elements with phase and polarization states was evaluated. The radar (reader) platform was held stationary, while the tag was moved in order to create the synthetic aperture. In this example, the tag was rotated using a rotary stage motor as shown in FIG. 16. The tag was moved in a circular arc with its axis perpendicular to the radar.

Over a sampling period of 20 seconds, approximately 4 million samples (4 MS) were stored and processed. A sampling period of 20 seconds was used to be compatible with the sampling rate and the rate of storage in the computer system. In examples of this technology, high speed sampling, storage and processing will be implemented to provide near real time RFID tag element decoding.

Figure 17:
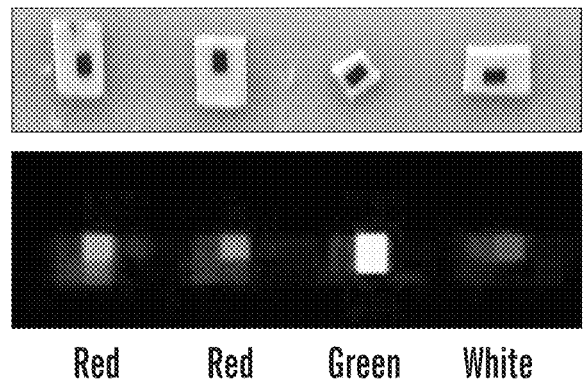
FIG. 17 illustrates polarization data extracted in a SAR imaging process.

The obtained data was processed based on the inverse SAR, or ISAR architecture. The validation of polarization detection was through rendering of different colors on a computer display to extract the polarization data. FIG. 17 shows the polarization renderings for horizontal (0°) polarized tag elements in the color red, a 45° polarized tag element in green, and a vertical (90°) polarized tag element in blue. The choice of the colors for representing polarization angle was arbitrary and was used to provide visual validation of the decoded polarization states.

Figure 18:
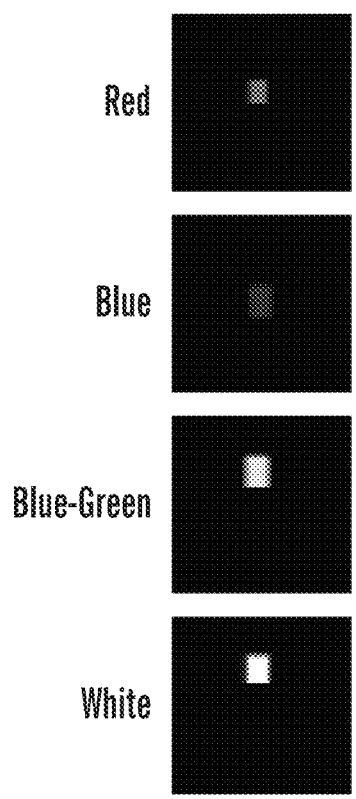
FIG. 18 illustrates phase data extracted in a SAR imaging process.

In FIG. 18, validation of phase detection was through rendering of different colors on a computer display to extract the phase data. Phase renderings for 0° phase delay in red, 45° phase delay in blue, 90° phase delay in blue-green, and 135° phase delay in white. The choice of the colors for representing phase delay time was arbitrary and was used to provide visual validation of the decoded phase states.

Having thus described the basic concept of the invention, it will be rather apparent to those of ordinary skill in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   simultaneously transmitting, by a radiofrequency identification (RFID) reader device, a first electromagnetic radiation at a first polarization to a scan area and second electromagnetic radiation at a second polarization, different from the first polarization, to the scan area;
   receiving, by the RFID reader device, re-radiated first electromagnetic radiation from an RFID tag located in the scan area at the first polarization and re-radiated second electromagnetic radiation from the RFID tag at the second polarization;
   generating, by the RFID reader device, a polarimetric radar image based on the first and second re-radiated electromagnetic radiation;
   determining, by the RFID reader device, based on the generated polarimetric radar image, a phase state and a polarization state of one or more microstructure elements located on the RFID tag; and decoding, by the RFID reader device, one or more items of information encoded in the one or more microstructure elements located on the RFID tag based on the determined phase state and polarization state from the polarimetric radar image.

2. The method of claim 1, wherein the decoding further comprises:
generating, by the RFID reader device, a visual display of the polarimetric radar image; and
displaying, by the RFID reader device, the decoded one or more items of information in the visual display of the polarimetric radar image.

3. The method of claim 1, wherein the first electromagnetic radiation and the second electromagnetic radiation are at frequencies between 60 GHz and 240 GHz.

4. A radiofrequency identification (RFID) reader device comprising:
at least a radiofrequency transmitter configured to simultaneously transmit first electromagnetic radiation at a first polarization to a scan area and second electromagnetic radiation at a second polarization, different from the first polarization, to the scan area;
a first radiofrequency receiver configured to receive re-radiated first electromagnetic radiation from an RFID tag located in the scan area at the first polarization, and a second radiofrequency receiver configured to receive re-radiated second electromagnetic radiation from the RFID tag at the second polarization; and
at least one of configurable hardware logic configured to be capable of implementing and a processor coupled to a memory and configured to execute programmed instructions stored in the memory comprising:
generating a polarimetric radar image based on the first and second re-radiated electromagnetic radiation;
determining based on the generated polarimetric radar image, a phase state and a polarization state of one or more microstructure elements located on the RFID tag; and
decoding one or more items of information encoded in the one or more microstructure elements located on the RFID tag based on the determined phase state and polarization state from the polarimetric radar image.

5. The RFID reader device of claim 4, wherein at least a radiofrequency transmitter is frequency modulation continuous wave (FMCW) millimeter wave transmitter.

6. The RFID reader device of claim 4, wherein the at least a radiofrequency transmitter has operating frequencies between 60 GHz and 240 GHz.

7. The RFID reader device of claim 4, wherein the at least one radiofrequency transmitter comprises a first radiofrequency transmitter configured to transmit the first electromagnetic radiation at a first frequency and a second radiofrequency transmitter configured to transmit the second electromagnetic radiation at a second frequency, wherein the first and second frequency are offset from one another.

8. The RFID reader device of claim 4, wherein the decoding further comprises:
generating a visual display of the polarimetric radar image; and
displaying the decoded one or more items of information in the visual display of the polarimetric radar image.

9. A radio frequency identification (RFID) system comprising:
at least one RFID tag having one or more microstructure elements located thereon; and
an RFID reader device comprising:
at least a radiofrequency transmitter configured to simultaneously transmit first electromagnetic radiation at a first polarization to a scan area and second electromagnetic radiation at a second polarization, different from the first polarization, to the scan area;
a first radiofrequency receiver configured to receive re-radiated first electromagnetic radiation from an RFID tag located in the scan area at the first polarization, and a second radiofrequency receiver configured to receive re-radiated second electromagnetic radiation from the RFID tag at the second polarization; and
at least one of configurable hardware logic configured to be capable of implementing and a processor coupled to a memory and configured to execute programmed instructions stored in the memory comprising:
generating a polarimetric radar image based on the first and second re-radiated electromagnetic radiation;
determining based on the generated polarimetric radar image, a phase state and a polarization state of one or more microstructure elements located on the RFID tag; and
decoding one or more items of information encoded in the one or more microstructure elements located on the RFID tag based on the determined phase state and polarization state from the polarimetric radar image.

10. The RFID system of claim 9, wherein each of the one or more microstructure elements has a polarization state and a phase state.

11. The RFID system of claim 9, wherein the at least a radiofrequency transmitter is frequency modulation continuous wave (FMCW) millimeter wave transmitter.

12. The RFID system of claim 9, wherein the at least a radiofrequency transmitter has operating frequencies between 60 GHz and 240 GHz.

13. The RFID system of claim 9, wherein the at least one radiofrequency transmitter comprises a first radiofrequency transmitter configured to transmit the first electromagnetic radiation at a first frequency and a second radiofrequency transmitter configured to transmit the second electromagnetic radiation at a second frequency, wherein the first and second frequency are offset from one another.

14. The RFID system of claim 9, wherein decoding further comprises:
generating a visual display of the polarimetric radar image; and
displaying the decoded one or more items of information in the visual display of the polarimetric radar image.

15. The RFID system of claim 9, wherein the one or more microstructure elements are microstrip patch antenna elements.

16. The RFID system of claim 9, wherein the at least one RFID tag has at least 25 microstructure elements per square inch, at least 100 microstructure elements per square inch, or at least 400 microstructure elements per square inch.

17. The RFID system of claim 9, wherein the at least one RFID tag is a chipless RFID tag.

18. The RFID system of claim 9, wherein each of the one or more microstructure elements are located at least one wavelength apart from each of the other microstructure elements of the RFID tag.

* * * * *